(12) United States Patent
Ebata et al.

(10) Patent No.: US 6,292,098 B1
(45) Date of Patent: Sep. 18, 2001

(54) SURVEILLANCE SYSTEM AND NETWORK SYSTEM

(75) Inventors: Tomoichi Ebata, Sagamihara; Chiho Kitahara; Minoru Koizumi, both of Yokohama; Toshiichiro Sasaki, Iwaki; Yoshiaki Adachi, Hitachiohta, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/386,476

(22) Filed: Aug. 31, 1999

(30) Foreign Application Priority Data

Aug. 31, 1998 (JP) ................................ P10-245644

(51) Int. Cl.⁷ .................................................. G08B 29/00
(52) U.S. Cl. .......................... 340/506; 370/235; 348/143
(58) Field of Search .................... 340/572.1, 506, 340/505, 825.06; 348/143, 9, 17, 21; 370/235, 253; 455/518, 519, 522, 524

(56) References Cited

U.S. PATENT DOCUMENTS

| | | | |
|---|---|---|---|
| 4,511,886 | * | 4/1985 | Rodriguez .......................... 348/143 |
| 4,679,077 | * | 7/1987 | Yuasa et al. ....................... 348/143 |
| 4,814,869 | * | 3/1989 | Oliver, Jr. .......................... 348/143 |
| 5,544,324 | * | 8/1996 | Edem et al. ........................ 370/58.1 |

OTHER PUBLICATIONS

Japanese Abstract "Moving Picture Communication Control Method and Communication Controller" Pub. No. 06284148 Date of Pub. Oct. 10, 1994.
Japanese Abstract "Video Monitor Device" Pub. No. 10042280 Date of Pub. Feb. 13, 1998.

* cited by examiner

*Primary Examiner*—Donnie L. Crosland
(74) *Attorney, Agent, or Firm*—Antonelli, Terry, Stout & Kraus, LLP

(57) ABSTRACT

In order to allow efficient use of bandwidth in communication paths in a surveillance system, the surveillance system has an operation unit which assigns fixed bandwidths to each of the communications taking place between camera nodes, which transfer image data at a uniform rate, and monitor nodes. A fixed bandwidth is assigned to, all communications taking place between the operation unit and sensor nodes, which generate alarm information at a non-uniform rate. If there is an increase in network traffic, bandwidth allocations, for communication between the camera nodes and the monitor nodes are reassigned so that bandwidth for these communications is reduced. The camera nodes use the bandwidth assigned to the camera nodes to transfer image data. The sensor nodes transfer alarm information using any bandwidth.

10 Claims, 28 Drawing Sheets

| bandwidth identifier | transfer service type | priority | reserved bandwidth | communication node |
|---|---|---|---|---|
| 0 | RS | BE | 3.0 | camera A |
| 1 | RS | BE | 2.0 | camera B |
| 2 | ES | MN | ALL | sensor A |
| 3 | SS | AB | ANY | camera C |

1670 — B_ALL : 6.0
1674 — RS[0] _R := 3.0
1678 — RS[1] _R := 2.0

1682 — IF ES _S > 0 THEN ( RS_S[0] :=0 RS_S[1] := 0 )
1686 — ELSE IF ((SS_S > B-ALL - RS_S[0] - RS_S[1] ) THEN
1690 —   RS_R[0] :=RS_R[1] := ( B_ALL - SS_S) / 2
1691        ELSE IF RS - S [0] : ≠ 3.0 then RS - S [0] : =3.0
1692            IF RS - S [1] : ≠ 2.0 then RS - S [1] : =2.0

SURVEILLANCE SYSTEM AND NETWORK SYSTEM

BACKGROUND OF THE INVENTION

The present invention relates to a communication system in which a plurality of devices communicate via a network. More specifically, the present invention relates to a surveillance system that retrieves information from sensors and a surveillance camera via a network.

In an example of a communication system for a surveillance system of the type which is actually in use today, an operation unit and a plurality of monitors in a surveillance center are used to retrieve information from a plurality of surveillance cameras and sensors via a network. In this type of surveillance system, communications take place over a network between individual surveillance cameras and. individual monitors, or between a plurality of sensors and an operation unit. This allows information to be sent from the surveillance cameras and sensors to the monitors and operation unit.

In this context, technologies to allocate bandwidth are known. These technologies assign bandwidth (capacity) beforehand for use by an individual communication, thus allowing separate communications to be performed without obstructing each other. For example, in the technology disclosed in Japanese laid-open patent publication number 10-42280, the total bandwidth is divided up according to the types of information to be sent in the surveillance system, and each division is assigned an available bandwidth. When the surveillance system is operating, the surveillance cameras and sensors send information to the monitors and the operation unit within the bandwidth assigned to the type of information being sent.

Japanese laid-open patent publication number 6-284148 presents another bandwidth restriction technology for communication systems. In this technology, a device performs peer to peer audio/video communications. When the communication throughput increases, only audio communications take place. When the communication throughput is reduced, both audio and video communications take place.

In technologies such as the one disclosed in Japanese laid-open patent publication number 42280, bandwidth is assigned in a fixed manner according to the type of information, to transferred. The rate at which information is generated over time may not be uniform, such during the transfer of information indicating an abnormality from a sensor or of control data such, as response commands issued from an operation unit operated by a user. If bandwidth assignments are based on the maximum transfer rate, there will be many time intervals during which the assigned bandwidths are not being used efficiently.

On the other hand, assigning bandwidth based on the average information transfer rate for information that is generated in a non-uniform manner over time will prevent responsive transfer of information when more information is being generated. This is not desirable, since it will result in a delay in the collection of important information that must be transferred rapidly, such as information relating to the presence of an abnormality or response commands.

Rather than pre-assigning bandwidth based on the type of information to be transferred, it would also be possible to transfer information according to the rate at which the information is generated. For example, if a large amount of information is generated all at once, individual communications will be affected in unpredictable ways by other communications, thus allowing communication problems to take place. These problems can result in the loss of various information, such as information relating to abnormalities, or control data, such as response commands.

If, in these cases, the audio/video communication technology disclosed in Japanese laid-open patent publication number 6-284148 is used, there would still be delays in the collection of important information that must be transferred rapidly, such as information relating to abnormalities and response commands.

SUMMARY OF THE INVENTION

In a surveillance system handling communication of both information that is generated at a uniform rate over time and information that is not generated at a uniform rate over time, the object of the present invention is to provide efficient use of bandwidth without causing delays in important information that must be transferred quickly. Another object of the present invention is prevent delays and loss of communication of important information transferred over a network, such as in a surveillance system.

In order to achieve the objects of the present invention, the present invention can, for example, provide a surveillance system that performs data transfers over a network between input node for capturing the state of an object to be monitored, an output node for outputting information representing the state of the object to be monitored, and a control node for controlling the input node and the output node. The control node performs the following operations. Before transfer of a first type of data, which is to be transferred uniformly over time started, the control node assigns a transfer capacity or the transfer of the first type of data so that the total sum of the transfer capacities used for transferring the first type of data is no more than a prescribed amount that is smaller than the total transfer capacity of the network. For transfer is be transferred in a tin a second type of data, which is data that non-uniform manner over time, no transfer capacity is assigned. If the input node, the output node, or the control node performs the first type of data transfer, the data transfer rate corresponds to the transfer capacity assigned for the transfer. If the input node, the output node, or the control node performs the second type of data transfer, the data transfer rate corresponds to the available transfer capacity in the network.

With this kind of transfer system, the transfer of data that is to be transferred in a nonuniform manner over time is not pre-assigned a bandwidth (capacity). For the transfer of data that is to be transferred in a uniform manner over time, the total sum of the transfer capacities to be used for these data transfers is assigned to be no more than a prescribed amount that is smaller than the total transfer capacity of the network. Thus, capacity is always maintained for the transfer of data that is to be transferred in a non-uniform manner over time.

The probability that all the data generated in a non-uniform manner over time will reach a maximum simultaneously is statistically very small. Therefore, the transfer capacity maintained, as described above, can be smaller than the total maximum generation rate of all the data transfers. For example, if a statistically determined maximum of the total rate at which nonuniform data is generated is reserved as the transfer capacity, there will be almost no delays in the transfer of data generated non-uniformly over time. However, the allocated transfer capacity can be set to less than or greater than the total sum of the rates at which data is generated based on factors such as providing transfer capacity leeway and tolerability of delays in the surveillance system. Thus, with this surveillance system, bandwidth can be used more efficiently for data transfers compared to assigning bandwidth based on the maximum rates at which data is generated, and communication delays are prevented for important information that must be transferred quickly.

In order to achieve the objects of the present invention, the present invention can also provide a surveillance system that transfers data over a network between an input node capturing the state of an object to be monitored, and an output node for outputting information representing the state of the object to be monitored. This surveillance system includes the following means. The surveillance system according to the present invention includes controlling means for controlling an input node or an output node transferring a first type of data. If the network traffic increases to at least a prescribed level, the controlling means reduces the transfer rate of the transfer of the first type of data over the network. When the input node or the output node performing the transfer of the first type of data reduces the transfer rate in response to actions of the controlling means, a transfer rate for the second type of data that is different from that of the first type is maintained or increased. With this type of surveillance system, if the network traffic increases to at least a prescribed level, the transfer rate of the first data type being transferred over the network is reduced, thus allowing the transfer rate of the second data type to be maintained or increased. This prevents delays and data loss in the transfer of the second type of data.

In order to achieve the objects of the present invention, the present invention can also provide a network system including a communication node for engaging in communications belonging to one of a plurality of communication types via a network, and a control node connected to the network. The control node includes means for storing a conditions table containing conditions that the bandwidth usage in the network used by the different types of communications need to fulfill; means for detecting bandwidth usage for communications in the network, based on various communication types; means for controlling the communication node via the network so that when the bandwidth usage detected for each communication type does not fulfill the conditions contained in the conditions table, the bandwidth usage is changed to fulfill these conditions.

With this type of network system, the conditions table stored in storing means contains conditions for individual communication types. Conditions that are fulfilled based on relations with network bandwidth used by other communication types can be included. Appropriate conditions can be provided so that when the bandwidth usage for the second communication type exceeds the result of subtracting the bandwidth allocated to the first communication type, as indicated in the bandwidth information table, from the network bandwidth that can be used by the first communication type and the second communication type, then the bandwidth used for the first communication type can be reduced. Alternatively, if a communication of the second communications type is detected, a communication of the first communication type can be stopped. Thus, by using the second communication type for communication of important information, delays and data loss in important information can be prevented.

BRIEF DESCRIPTION OF THE DRAWINGS

FIG. 38 is a diagram which shows the bandwidth information table according to the second embodiment.

FIG. 39 is a diagram which shows the network control rules table according to the second embodiment.

DESCRIPTION OF THE PREFERRED EMBODIMENT

The following is a description of a first embodiment of a communication system according to the present invention as implemented in a surveillance system.

Figure 1:
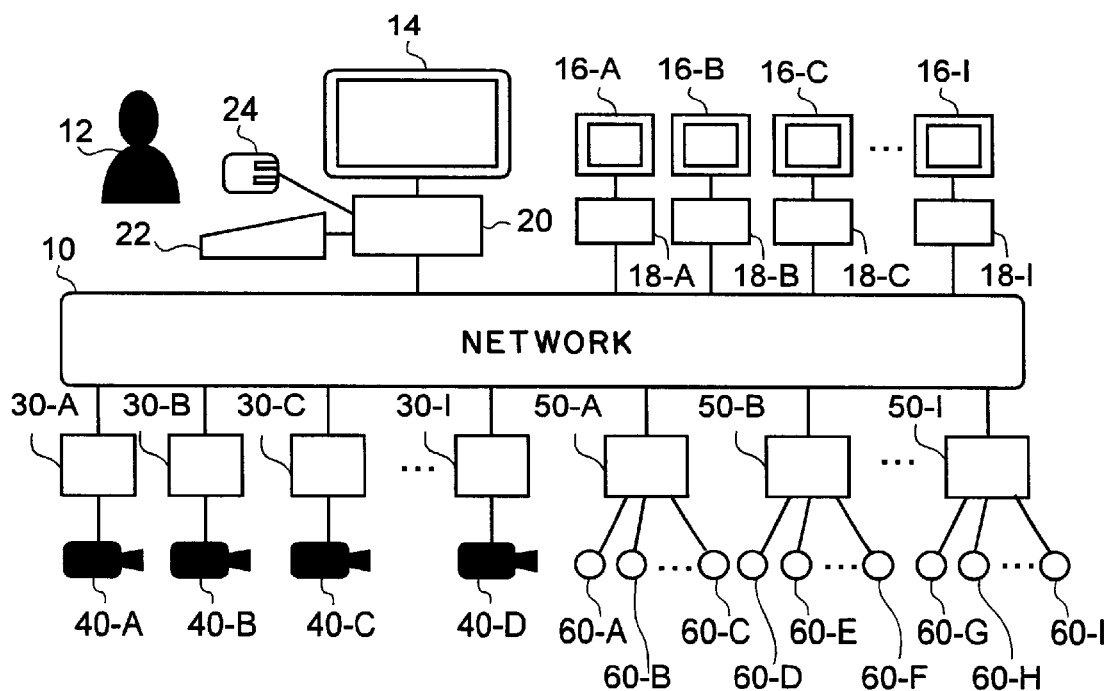
FIG. 1 is a block diagram which shows the structure of a video surveillance system according to the first embodiment.

FIG. 1 shows the structure of a surveillance system according to this embodiment. This surveillance system can be used in night-time surveillance to prevent burglaries, day-time department surveillance for thorough monitoring, and monitoring of equipment in factories. In this surveillance system, a network 10 connects cameras 40 via camera nodes 30, sensors 60 via sensor nodes 50, and monitors 16 via monitor nodes 18. An operation unit 20 operated by a user is also connected to the network 10. The operation unit 20 includes a personal computer, a workstation, or the like and includes a display 14, as well as a mouse 24 and a keyboard 22, which serve as input devices. A user 12 uses the operation unit 20 to operate the surveillance system. A plurality of operation units 20 can be provided. With this configuration, the images from the cameras 40 are displayed on the monitors, 16 via the network 10 based on instructions, from the operation unit 20. If an abnormality, such as fire or intrusion, is detected, the sensors 60 display corresponding alarm information to the plurality of monitors 16 via the network 10.

Figure 2:
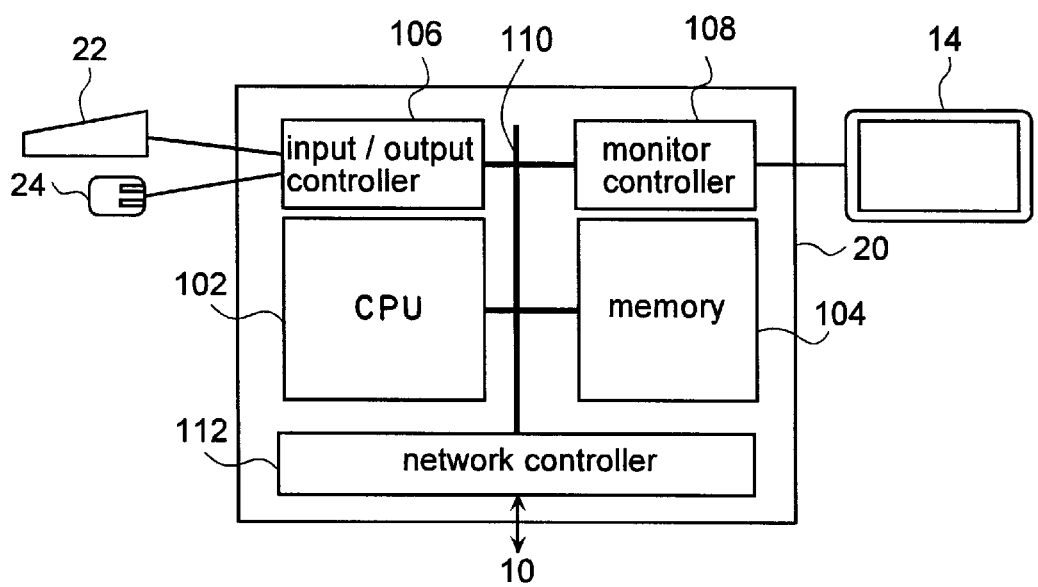
FIG. 2 is a block diagram which shows the hardware structure of an operation unit according to the first embodiment.

FIG. 2 shows the structure of the hardware in the operation unit 20. The operation unit 20 includes a hardware structure in which a bus 110 is used to connect: a network controller 112; a CPU 102; a memory 104; an input/output controller 106 for controlling the keyboard 22 and the mouse 24; and a monitor controller 108.

Figure 3:
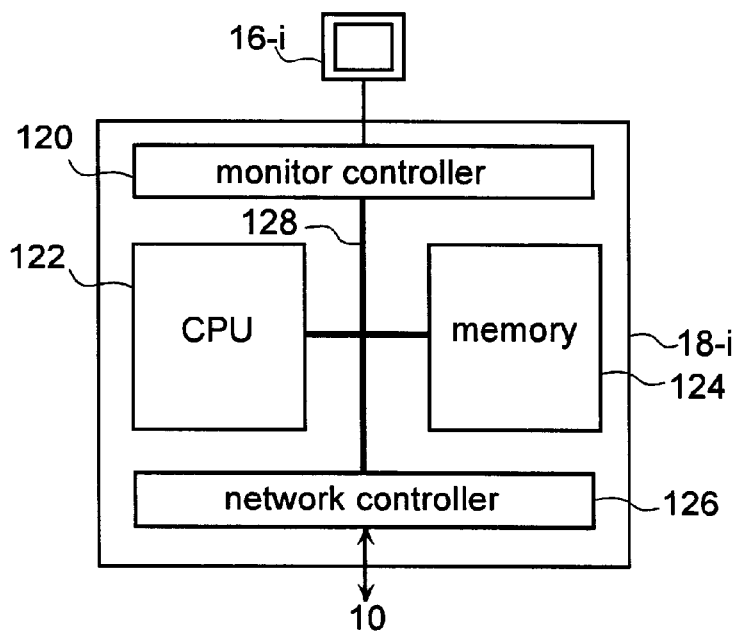
FIG. 3 is a block diagram which shows the hardware structure of a monitor node according to the first embodiment.

FIG. 3 shows the structure of the hardware in a typical monitor node 18. The monitor node 18 includes a hardware structure in which a bus 128 is used to connect: a monitor controller 120 for controlling the monitor 16 used to display images; a CPU 122; a memory 124; and a network controller 126.

Figure 4:
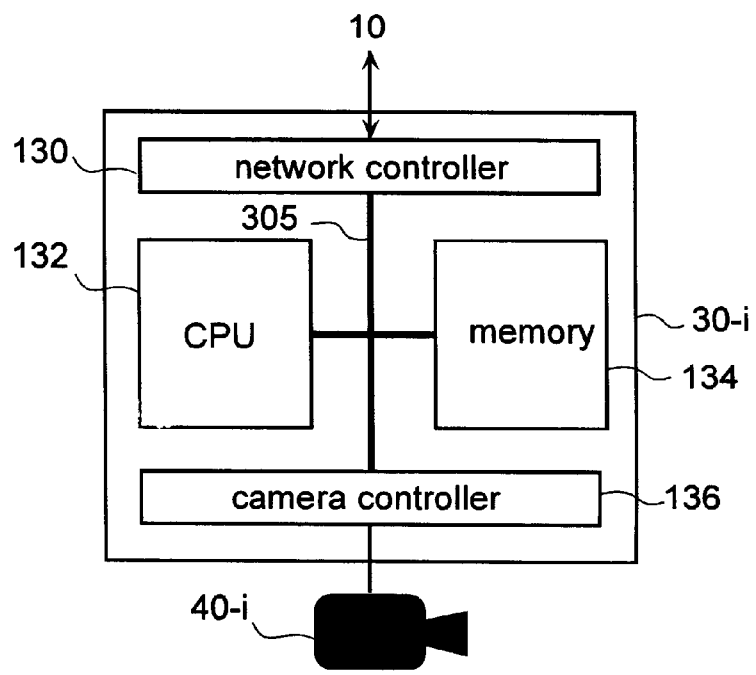
FIG. 4 is a block diagram which shows the hardware structure of a camera node according to the first embodiment.

FIG. 4 shows the structure of the hardware in a typical camera node 30. The camera node 30 includes a hardware structure in which a bus 305 is used to connect: a camera controller 136 controlling a video camera 40i; a CPU 132; a memory 134; and a network controller 130.

Figure 5:
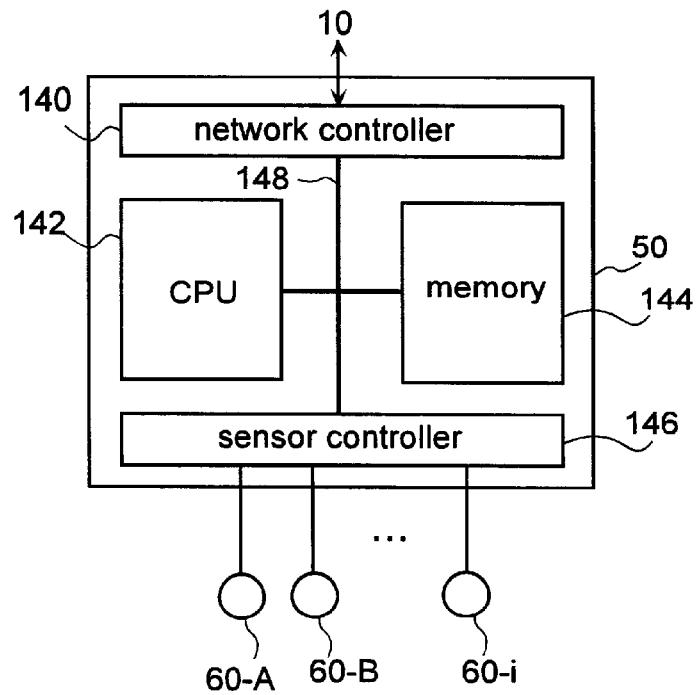
FIG. 5 is a block diagram which shows the hardware structure of a sensor node according to the first embodiment.

FIG. 5 shows the structure of the hardware in a typical sensor node 50. The sensor node 50 includes a hardware structure in which a bus 148 is used to connect: a sensor controller 146 connected to a sensor group 60i for reading sensor settings and abnormality detection signals from the sensors; a CPU 142; a memory 144; and a network controller 140.

Figure 6:
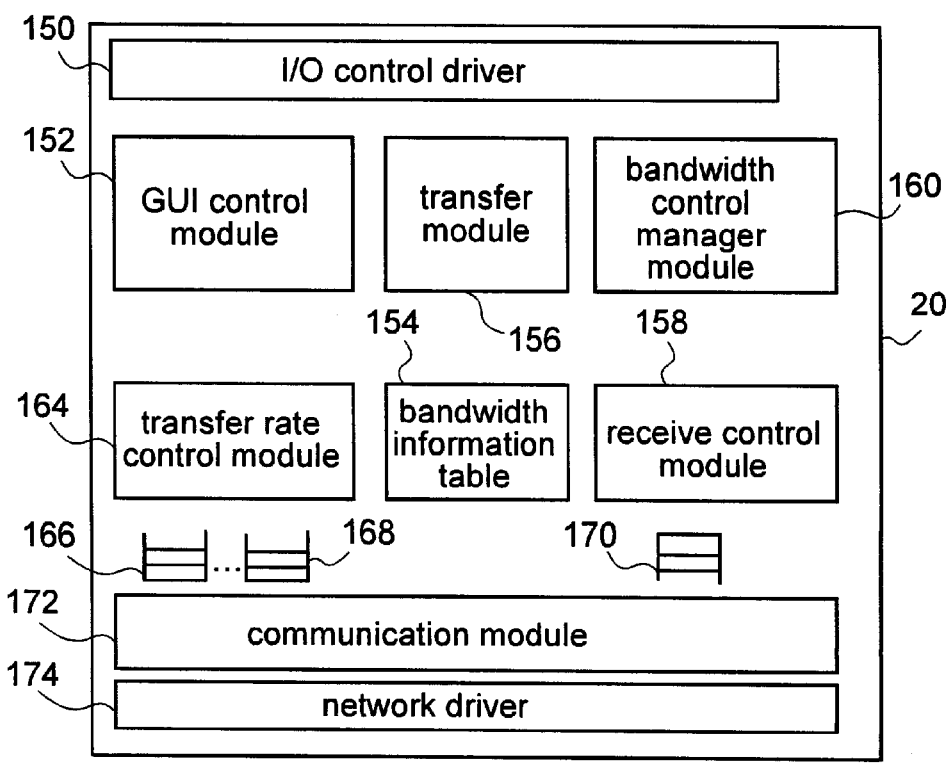
FIG. 6 is a diagram which shows the software structure of an operation unit according to the first embodiment.

FIG. 6 shows the software structure used in the operation unit 20. This software structure is implemented on the operation unit 20 by running a program stored in the memory 104 on the CPU 102 to perform various functions to be described later on the operation unit 20. The software structure includes: a communication driver 174; a communication module 172; an I/O control driver 150; a GUI control module 152; a transfer module 156; a bandwidth control manager module 160; a transfer rate control module 164; a bandwidth information table 154; a receive control module 158; send queues 166, 168; and a receive queue 170.

The communication driver 174 controls the network controller 112 shown in FIG. 2. Using the communication driver 174, the communication module 172 implements unicasting communications, where messages are transferred to a specified device, as well as broadcasting communications, where messages are transferred to all devices connected to the network. The I/O control driver 150 controls the monitor 14, the keyboard 22, and the mouse 24.

The transfer module 156 uses the communication module 172 to specify transfer service types to the nodes. The transfer service types include "reserved bandwidth transfer service", "statistical multiplex transfer service", and "emergency transfer service". The bandwidth control manager module 160 reserves and releases bandwidth for individual transfers based on the transfer service type. If a communication delay takes place in the network, the bandwidth control module 160 restricts communications to eliminate the delay and then disables the restriction. These operations are implemented by having the communication module 172 issue commands to other nodes.

The send queues 166, 168 are set up to correspond to different transfer rates. The communication module 172 sends the outgoing data stored in the send queues 166, 168 using the corresponding transfer rates. The transfer rate observing module 164 switches between the send queues 166, 168, which hold the outgoing data, based on the transfer service type to be used for the transfer of outgoing data. The receive control module 158 processes incoming data received by the communication module 172 via the receive queue.

Alarm information received by the operation unit 20 goes to the GUI control module 152 via the receive control module 158. The GUI control module 152 then performs operations, such as communicating the alarm information to the user via the input/output control driver 150, receiving requests from the user to execute transfer services from the input/output control driver 150, and sending this information to the transfer module 156.

Figure 7:
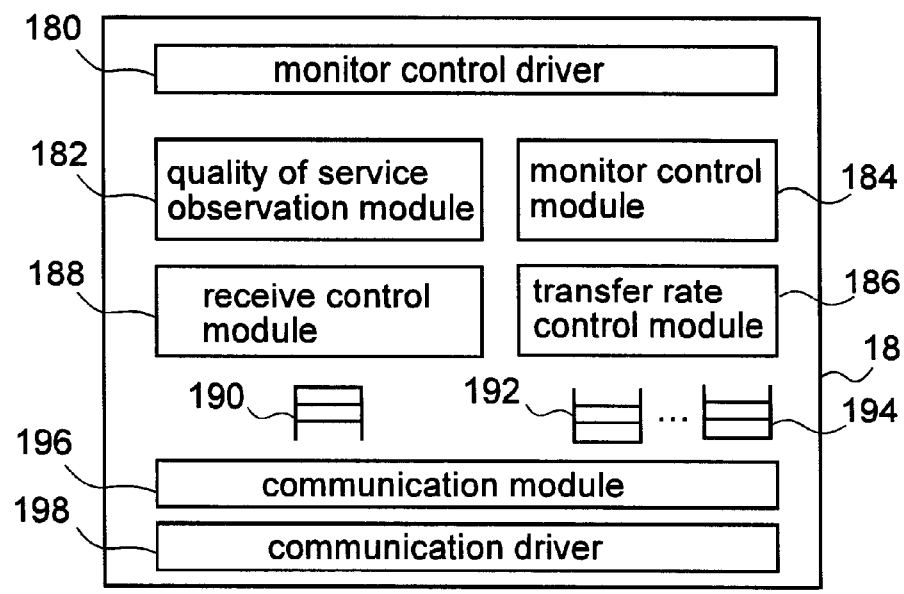
FIG. 7 is a diagram which shows the software structure of a monitor node according to the first embodiment.

FIG. 7 shows the structure of the software used in the monitor nodes 18. This software structure is implemented on the monitor node 18 by having a program stored in the memory 124 executed on the CPU 122 so that the functions described below are provided on the monitor node 18. The software structure of the monitor node 18 includes: a communication driver 198; a communication module 196; a monitor control driver 180; a monitor control module 184; a receive control module 188; a transfer rate control module 186; a quality of service observation module 182; send queues 192, 194; and a receive queue 190.

The communication driver 198 controls the network controller 126. Using the communication driver 198, the communication, module 196 implements unicasting communications, where messages are transferred to a specified device, as well as broadcasting communications, where messages are transferred to all devices connected to the network. The send queues 192, 194 are set up to correspond to different transfer rates. The communication module 196 sends the outgoing data stored in the send queues 192, 194 using the corresponding transfer rate. The transfer rate control module 186 switches between the send queues 192, 194, which store the outgoing data, based on the type of transfer service to be used for the outgoing data. The receive control module 158 processes the incoming data received by the communication module 196 via the receive queue 190.

Image data Perceived by the monitor node 18 goes from the receive control module 158 to the monitor control module 184, which displays the image data on the monitor 16 using the monitor control driver 180. When reserved bandwidth transfer service data is received, the quality of service observation module 182 measures differences in send and receive intervals to detect delays in communication. If communication delays are detected, a delay report is sent to the bandwidth control manager module 160 of the operation unit 20.

Figure 8:
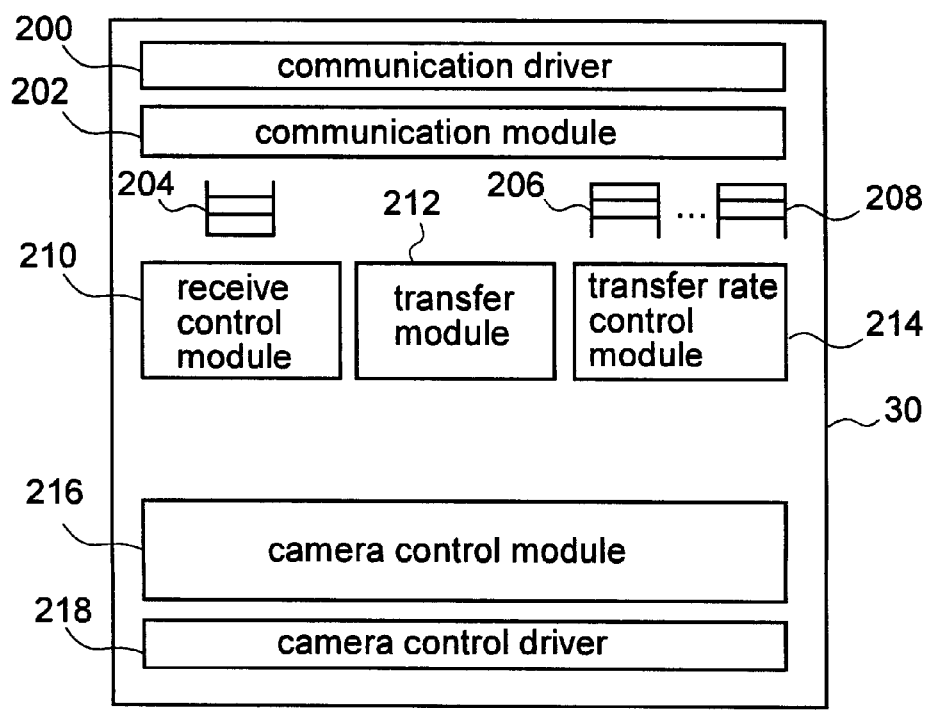
FIG. 8 is a diagram which shows the software structure of a camera node according to the first embodiment.

FIG. 8 shows the structure of the software in the camera node 30. This software structure allows the camera node 30 to provide the features described below by having the CPU 132 execute a program stored in the memory 134. The software structure of the camera node 30 includes: a communication driver 200, a communication module 202, a camera control driver 218, a camera control module 216, a transfer rate control module 214, a receive control module 210, a transfer module 212, send queues 206, 208, and a receive queue 204.

The communication driver 200 controls the network controller 130. Using the communication driver 200, the communication module 202 implements unicasting communications, where messages are transferred to a specified device, as well as broadcasting communications, where messages are transferred to all devices connected to the network. The camera control driver 218 controls the video camera 40. The camera control module 216 takes image data processed from data from the video camera 40 and sends it via the send queues 206, 208 and the communication module 202.

The send queues 206, 208 are set up to correspond to different transfer rates. The communication module 202 sends the outgoing data stored in the send queues 206, 208 using the corresponding transfer rates. The transfer rate control module 214 switches between the send queues 206, 208, which hold the outgoing data, based on the transfer service type to be used for the transfer of outgoing data. The receive control module 210 processes incoming data received by the communication module 202 via the receive queue 204. The transfer module 212 controls the transfer service type and the transfer rate used by the camera node 30.

Figure 9:
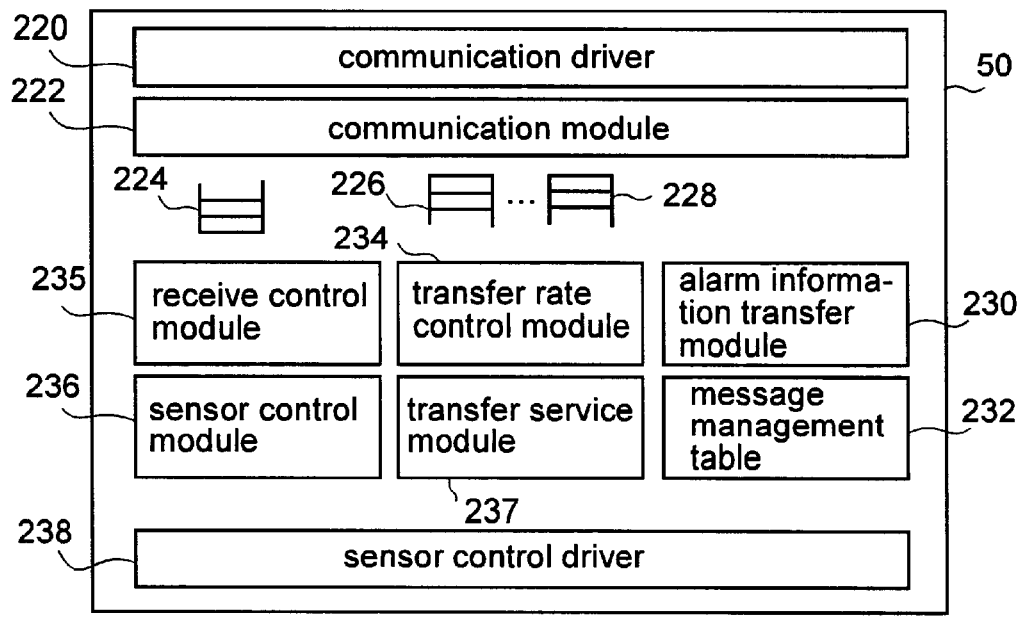
FIG. 9 is a diagram which shows the software structure of a sensor node according to the first embodiment.

FIG. 9 shows the structure of the software in the sensor node 50. The software structures allows the sensor node 50 to provide the functions described below by having the CPU 142 execute a program stored in tile memory 144. The software structure of the sensor node 50 includes: a communication driver 220; a communication module 222; a sensor control driver 238; a sensor control module 237; a receive control module 235; a receive queue 224; send queues 226, 228; a transfer module 237; a message management table 232; and an alarm information transfer module 230.

Using the communication driver 220, the communication, module 222 implements unicasting communications, where messages are transferred to a specified device, as well as broadcasting communications, where messages are transferred to all devices connected to the network. The sensor control driver 238 controls the sensor 60. The send queues 226, 228 are set up to correspond to different transfer rates. The communication module 222 sends the outgoing data stored in the send queues 226, 228 at the corresponding transfer rates. The transfer rate control module 234 switches between the send queues 226, 228, which store the outgoing data, based on the transfer service type to be used for the transfer of outgoing data. The receive control module 235 processes the incoming data received by the communication module 222 via the receive queue 224.

The sensor control module 236 sends alarm messages to the alarm information transfer module 230 in response to input from the sensors 60. The alarm information transfer module 230 sends alarm messages, in the form of alarm information, to the operation unit 20 via the send queues 206, 208 and the communication module 202. The alarm messages are stored in the message management table 232. The transfer module 237 controls the transfer service type used in the communication performed by the sensor node 50.

Figure 10:
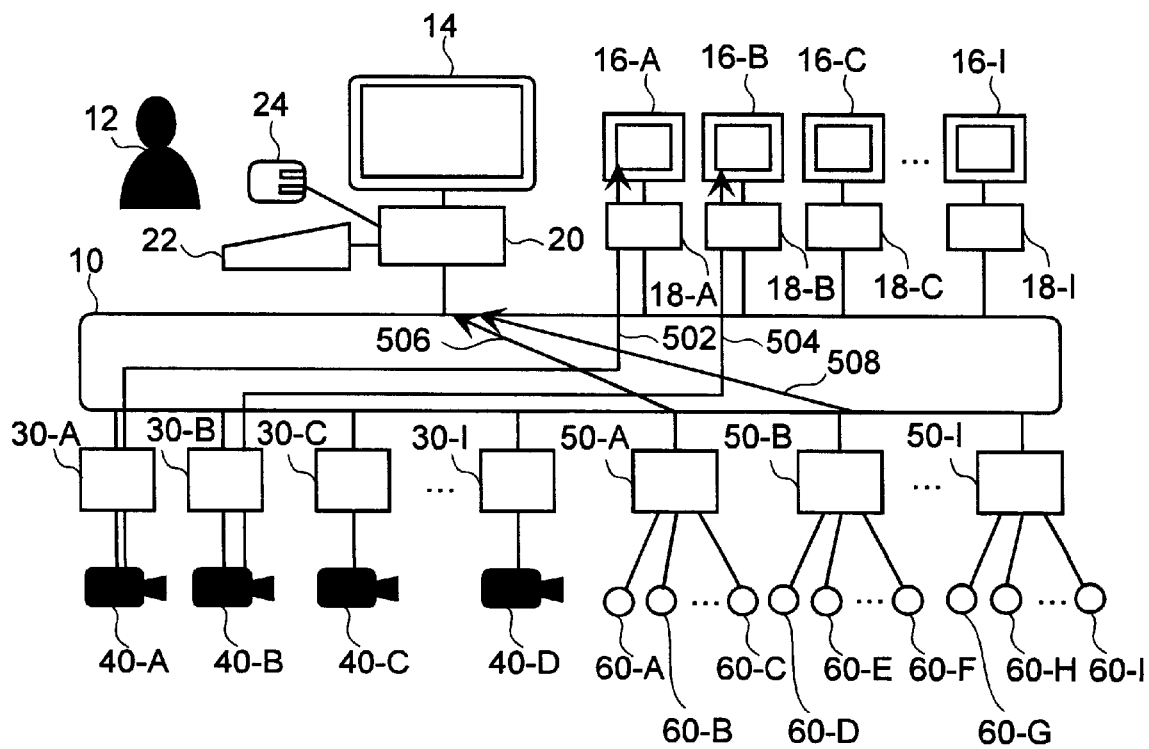
FIG. 10 is a block diagram which shows how data is transferred in a surveillance system according to the first embodiment.
Figure 11:
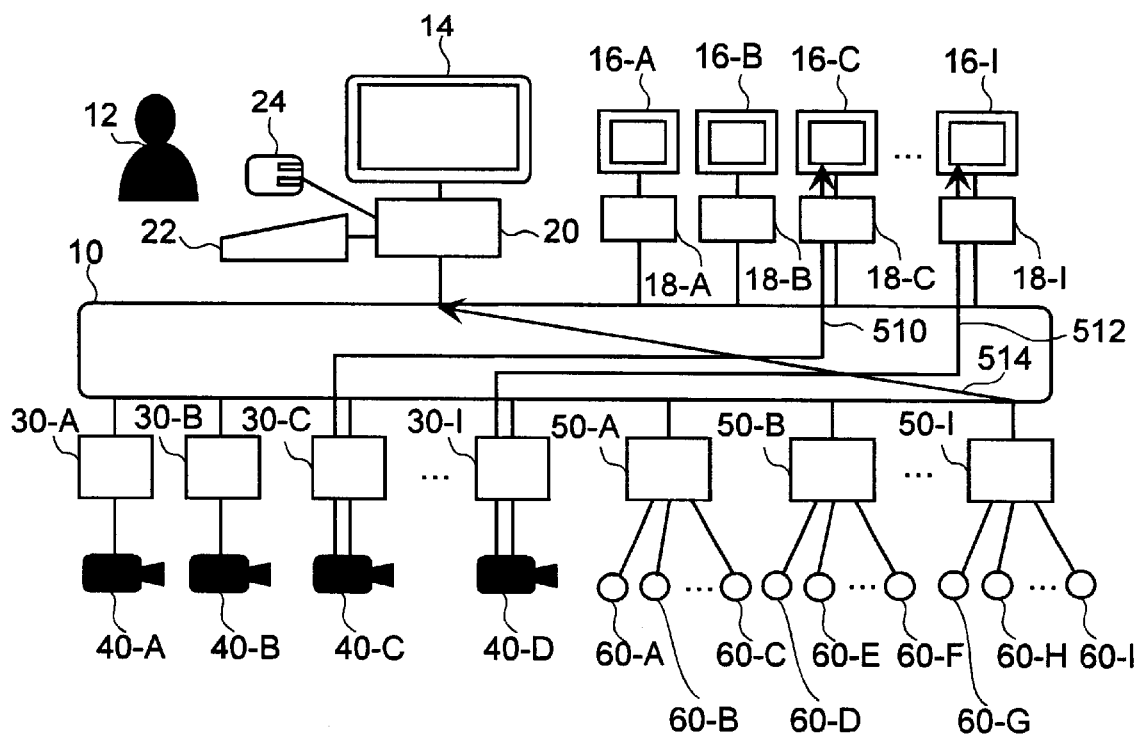
FIG. 11 is a block diagram which shows how data is transferred in a surveillance system according to an embodiment.

The following is a description of how the surveillance system according to this embodiment works. First, an overview will be provided. As shown in FIG. 10 and FIG. 11, in this surveillance system the camera nodes (30-A–30-I) which send image data and the monitor node (18-A–18I) which receives image data are regularly switched while image data is transferred from the plurality of camera nodes (30-A–30-I) to the plurality of monitor nodes (18-A–18-I). At the same time, the sensor nodes (50-A–50-I), at which alarm information is generated, send the alarm information to the operation unit 20.

In FIG. 10, image data is transferred (502, 504) from the plurality of camera nodes (30-A, 30-B) to the monitor nodes (18-A, 18-B). Alarm information is transferred (506, 508) from the sensor nodes (50-A, 50-B) to the operation unit 20. FIG. 11 shows the camera nodes sending image data switched from the state shown in FIG. 10 so that image data is transferred (510, 512) from different camera nodes (30-C, 30-I) to monitor nodes (18-C, 18-I). Alarm information is transferred (514) from the sensor node (50-I) to the operation unit 20.

In this manner, the camera nodes 30 which send image data are sequentially switched. Thus, the watching the monitors 16 is provided with cycling video images as if he or she is performing direct inspections. The switching between the camera nodes 18 is performed by having the operation unit 20 transfer data for controlling operations to the camera nodes 30 and the monitor nodes 18. The manner in which switching takes place can be determined automatically by the operation unit 20 based on a pre-set schedule. Alternatively, switching can take place based on instructions provided by the user watching the monitor 16 via the operation unit 20. Instructions from the user can be received using menus displayed on the operation unit 20 or by selecting camera icons displayed on a map, where the positions of the cameras 40 are displayed on the map using camera icons. If some kind of abnormality (e.g., fire, intrusion) is detected by the sensors 60 during the video image cycling performed by this surveillance system, the sensor node 50 sends alarm information indicating the nature of the detected abnormality to the user who is at the operation unit 20. Control data, in the form of alarm information, is sent over the network 10, which is also carrying other image data.

This surveillance system also has an emergency transfer function, in which a specific camera node 30 sends the monitor node 18.image data which is more detailed and has a larger data capacity compared with image data transferred during video image cycling. The transfer of image data from other camera nodes 30 is stopped. This kind of emergency transfer function is used, for example, if a suspicious individual is noticed during video image cycling. With this function, the user can inspect the suspicious individual more carefully using the detailed image.

As described above, communications are performed in this embodiment using three transfer service types: "reserved bandwidth transfer service"; "statistical multiplex service"; and "emergency transfer service".

The "reserved bandwidth transfer service" is used for image data and the like where there is a amount of large data and the data is transferred continuously at a fixed transfer rate. In this surveillance system, the reserved bandwidth transfer service is used for transferring image data from the camera nodes 30 to the monitor nodes 18 during video image cycling. The camera nodes 30 performing data transfer with the reserved bandwidth service uses a transfer rate specified by the operation unit 20 to transfer image data having a pre-set (low) level of detail that is appropriate for the transfer rate.

The "statistical multiplex transfer service" is used for communication of data where the transfer rate is variable. In this surveillance system, the statistical multiplex transfer service used for the transfer of alarm information from the sensor nodes 50 to the operation unit 20 well as transfer of control data from the operation unit 20 to the various devices. When using statistical multiplex transfer service, the sensor nodes 50 and the operation unit 20 transfer the generated data at the maximum allowable transfer rate.

The "emergency transfer service" is given priority over other communications and is used for large volumes of data. In this surveillance system, the emergency transfer service is used for the emergency transfer function described above in order to provide transfer of detailed image data between the camera node 30 and the monitor node 18. When transferring data using the emergency transfer service, the camera node 30 uses the transfer rate specified by the operation unit 20 to send image data at a (high) level of detail appropriate for the transfer rate.

Figure 12:
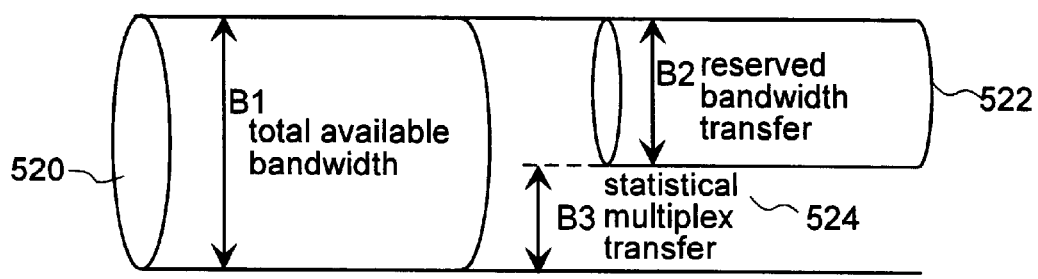
FIG. 12 is a diagram which shows how bandwidth is distributed in the first embodiment.

The bandwidth available for use by the reserved bandwidth transfer service is smaller than the total available bandwidth of the network 10. Even when data transfer using the reserved bandwidth transfer service is taking place, it is always possible to allocate a fixed bandwidth for transfers using the statistical multiplex transfer service. In FIG. 12, for example, if a total available bandwidth 520 has a width Bl, a bandwidth 522 having a width B2 can be assigned for reserved bandwidth transfer services. At a minimum, a bandwidth 524 with a bandwidth B3 will always allow the use of the statistical multiplex transfer service even if the reserved bandwidth transfer service is being used.

It would be desirable to set the width B3 of the bandwidth 524 for the statistical multiplex transfer service to a value that corresponds to the maximum sum of the transfer rates used by the number of statistical multiplex transfer services that can take place simultaneously. This allows the network bandwidth to be used more efficiently compared to having each communication that generates data irregularly allocated a bandwidth corresponding to a maximum data transfer rate. However, in this embodiment, the immediacy of statistical multiplex transfer service communications is maintained by restricting communications, as mentioned above, if the width B3 of the bandwidth 524 allocated for statistical multiplex services is exceeded by the sum of the communication transfer rates from statistical multiplex transfer service communications.

Figure 13:
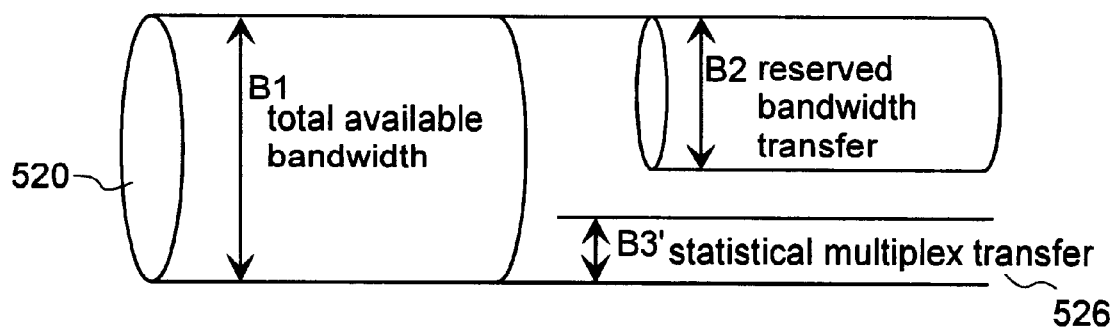
FIG. 13 is a diagram which shows how bandwidth is distributed in the first embodiment.
Figure 14:
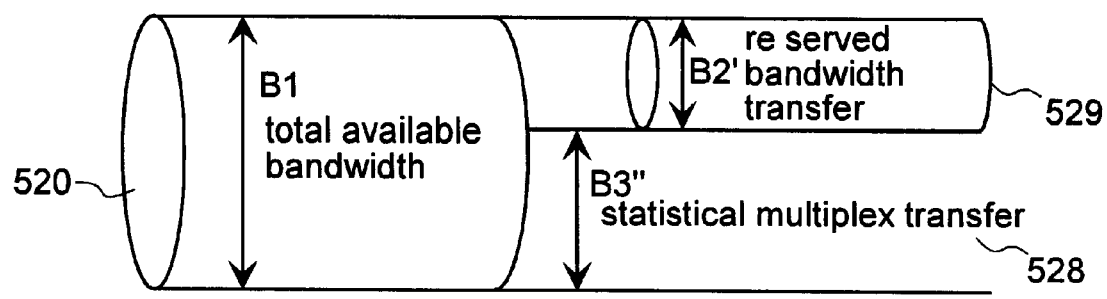
FIG. 14 is a diagram which shows how bandwidth is distributed in the first embodiment.

As shown in FIG. 13, in practice, the bandwidth used by statistical multiplex transfer service communications can be a bandwidth 526 having a width B3' that is smaller than the width B3 of the bandwidth 524. Also, as shown in FIG. 14, the bandwidth used for reserved bandwidth. Transfer service communications can be a bandwidth 529 having a width B2' that is smaller than the width B2 of the bandwidth 522. In this case, the bandwidth used by statistical multiplex services would be a bandwidth 528 having a width B3" that is larger than the width B3 of the bandwidth 524. This situation would occur if the reserved bandwidth transfer service communications are such that the number of communications×the transfer rate of the communications<the bandwidth B2 of the bandwidth 522, and if the transfer rate of the statistical multiplex transfer service communications exceeds the width B3 of the bandwidth 524. In addition to cases in which the sum of the bandwidths assigned for reserved bandwidth transfer services<the width B2 of the bandwidth 522 and the transfer rate of the statistical multiplex transfer service communications exceeds B3, this situation can also happen when communication restrictions, to be described later, are applied.

Figure 15:
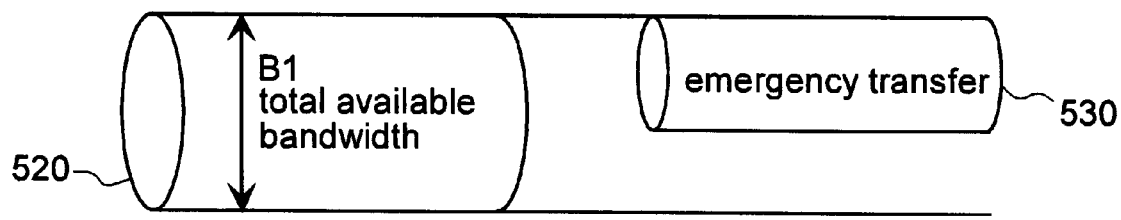
FIG. 15 is a diagram which shows how bandwidth is distributed in the first embodiment.

The bandwidth available for use for emergency transfer service communications is a fixed bandwidth, as shown in FIG. 15, but this bandwidth is smaller than the total available bandwidth of the network 10. Thus, even when emergency transfer service communications are taking place, a fixed bandwidth is always allocated for statistical multiplex data service communications.

Figure 16:
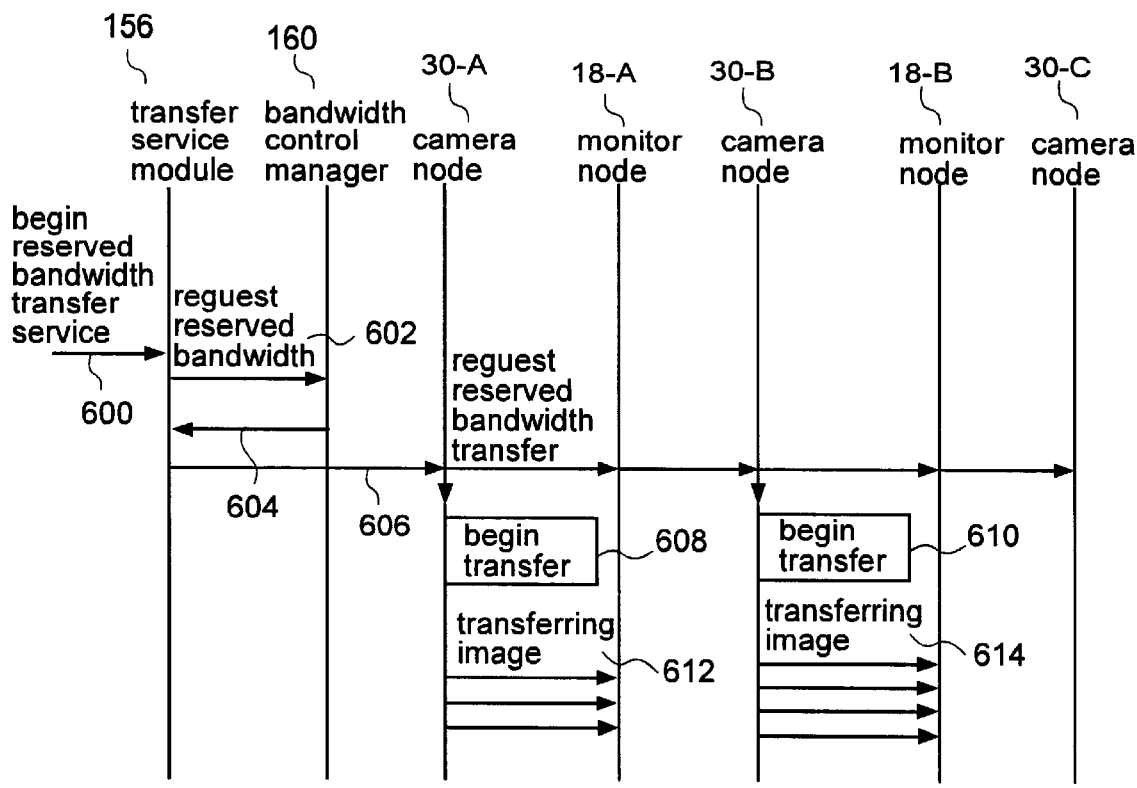
FIG. 16 is a diagram which shows the sequence of operations involved in communications using the reserved bandwidth transfer service according to the first embodiment.

The following is a description of the sequence of operations executed in communications using different transfer service types. First, communications using the reserved bandwidth, transfer service will be described. As shown in FIG. 16, when reserved bandwidth transfer service communication is to take place, the nodes for which reserved bandwidth transfer service communication is to be performed are specified and an instruction to activate the reserved bandwidth transfer service is issued via user selection or from a prescribed user program at the operation unit 20 (600).

The transfer module 156 issues a request for reserved bandwidth 602 to the bandwidth control manager module 160. The bandwidth control manager module 160 returns a bandwidth allocation OK 604 if there is free bandwidth available for the reserved bandwidth transfer service. This indication is received by the transfer module 156, which then broadcasts the request for reserved bandwidth, including a list of nodes that will perform reserved bandwidth transfer service communications as well as transfer rates (606). The camera nodes 30 specified in the request for reserved bandwidth receive this request and being transferring image data to the monitor node 18 using the specified transfer rates (608, 610). The camera nodes 30 that have begun the image transfer operation continue transferring images until they receive a subsequent stop request (612, 614).

The following is a description of statistical multiplex transfer service communications. When statistical multiplex transfer service communication is to take place, the nodes for which statistical multiplex transfer service communication is to be performed are specified and an instruction to activate the statistical multiplex transfer service is issued via user selection or from a prescribed user program at the operation unit 20. The transfer module 156 broadcasts a request for statistical multiple transfer, including a list of nodes for which statistical multiplex transfer service communication is to be performed.

Figure 17:
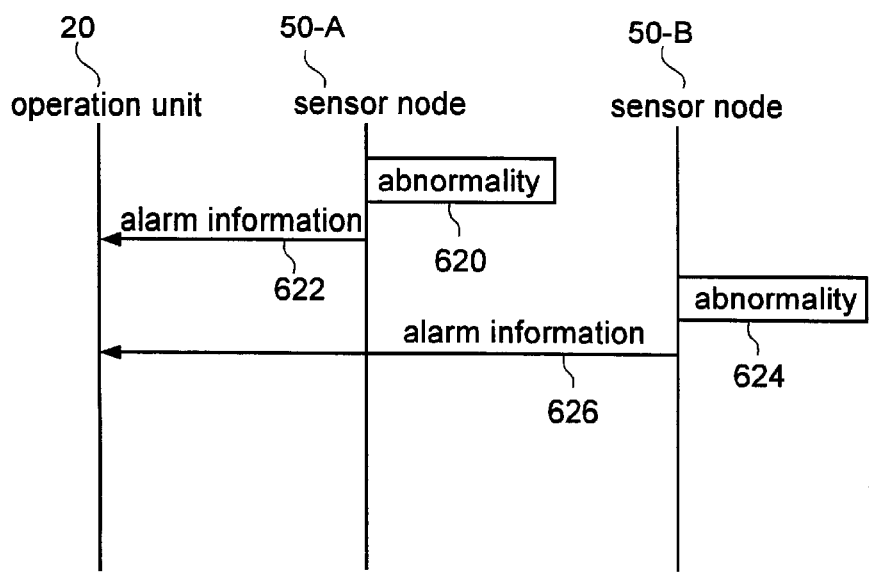
FIG. 17 is a diagram which shows a sample sequence of operations involved in communications using the statistical multiplex transfer service according to the first embodiment.

Referring to FIG. 17, as a result of the request for statistical multiplex transfer, when the sensor nodes 50 for which statistical multiplex transfer service communication has been requested detect abnormalities via the sensors 60 (620, 624), the alarm information 622, 626 is transferred to the operation unit 20 using the maximum possible transfer rate. The maximum possible transfer rate in this case is the maximum bandwidth that the sensor nodes 50 can use according to the protocol of the network 10. For example, if the network is an Ethernet network, the following would apply. In Ethernet, data transfers can take place when there is no data being transferred between other nodes. If a data transfer collision takes place on the network between a plurality of nodes, data transfer privileges are granted to a single node according to the CSMA/CD protocol. The node that receives communications privileges is determined randomly. Thus, the maximum possible transfer rate for the sensor node 50 would be the actual outgoing transfer rate according to the CSMA/CD protocol when all the alarm information to be sent is transmitted. In the description of this embodiment, an Ethernet network is given as an example, but it would also be possible to have a network based on the CSMAICD protocol that uses another communication medium or a network based on another protocol.

Referring to FIG. 12, if the alarm information to be sent via the statistical multiplex transfer service, is generated at a rate that exceeds the width B3 of the bandwidth 524 allocated for statistical multiplex transfer services, there is an increased chance for collisions between the data sent from the sensor nodes 50 and the camera nodes 30. Thus, data transfer from the sensor nodes 50 can take place at a fixed probability, but the camera nodes 30 are unable to transfer data at the transfer rate specified in the request for reserved bandwidth transfer. This can cause a delay in the transfer of the image data from the camera node 30 to the monitor node 18.

Figure 18:
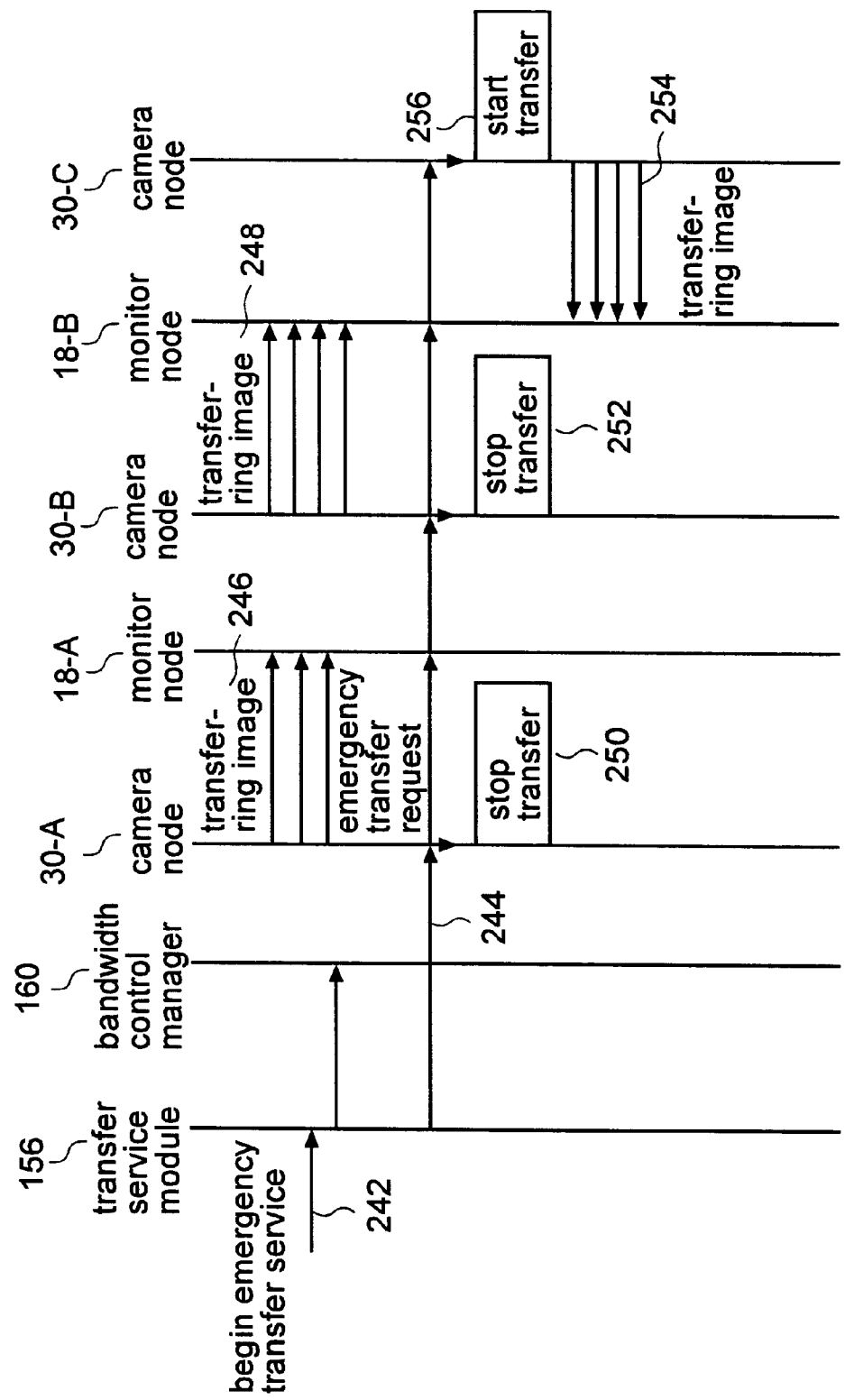
FIG. 18 is a diagram which shows a sample sequence of operations involved in communications using emergency transfer service according to the first embodiment.

The following is a description of communications using the emergency transfer service. Emergency transfer service communications takes place according to the sequence shown in FIG. 18. While the camera nodes 30-A, 30-B are transferring image data via the reserved bandwidth transfer service, a user input or instructions from a prescribed user program results in a request for the emergency transfer service along with an indication of the nodes for which emergency transfer service communications are to take place (242). The transfer module 156 broadcasts a list of nodes for which data transfer is to stop, a list of nodes for which transfer of high-density image data is to be started, and an indication of the transfer rate at which the high-density image data is to be transferred (244). The camera nodes 30 which were specified by the emergency transfer request for a halt of data transfer (246, 248) receive the request an transferring data (250, 252). The camera node 30 specified in the emergency transfer request high-density image data transfer (256) begins transferring image data to the monitor node 18 using the transfer rate for high-density images, as specified in the emergency transfer request.

The following is a description of the communication restrictions referred to above. When network traffic increases, communication restrictions provide drops in transfer rates for reserved bandwidth transfer service communications and the like. This prevents problems, such as data loss at the nodes, while allowing statistical multiplex transfer service communications to take place without delays.

Figure 19:
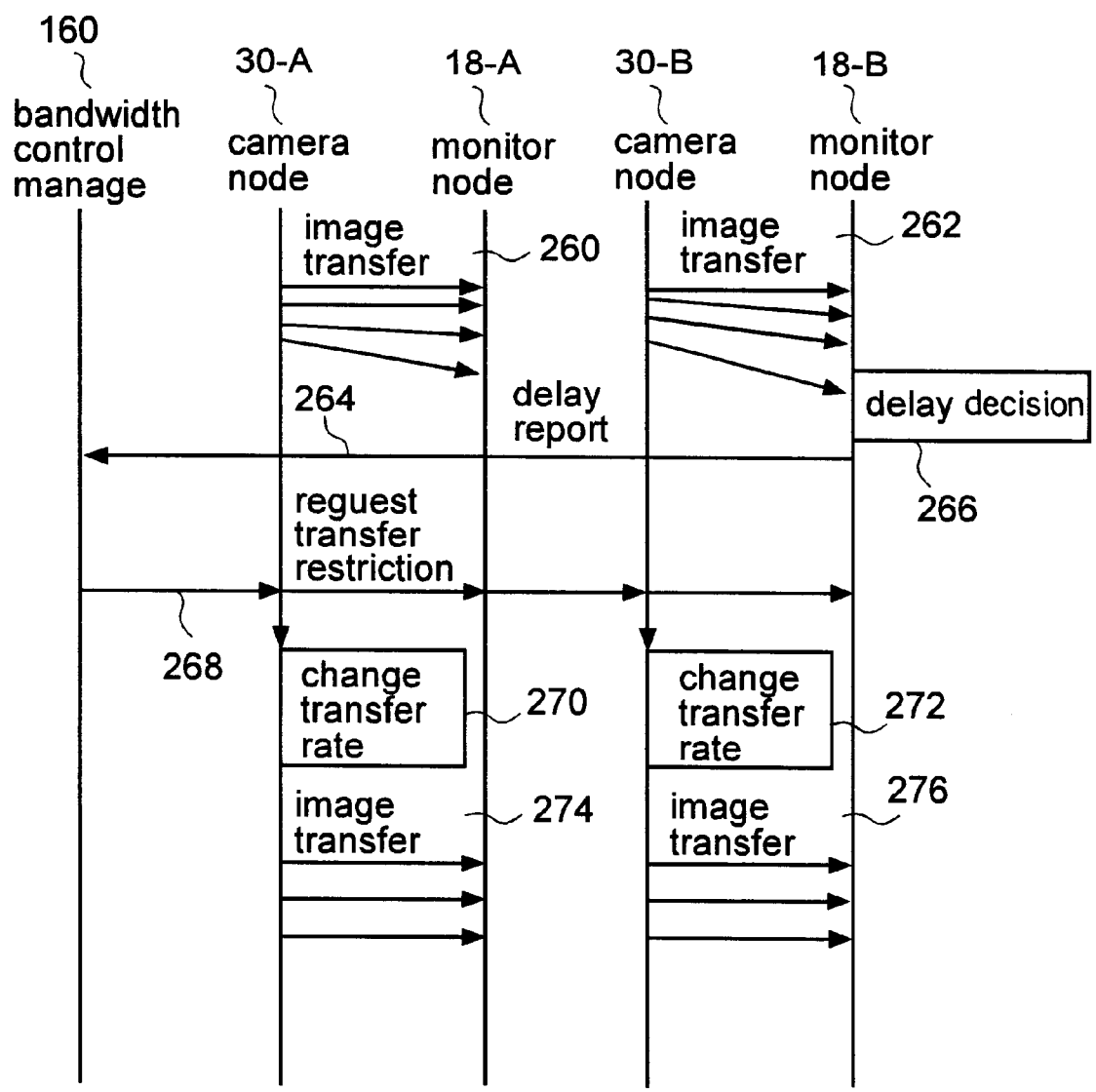
FIG. 19 is a diagram which shows the sequence of operations involved in communication restrictions according to the first embodiment.

FIG. 19 shows the sequence of operations used to implement restricted communications. In this surveillance system, a monitor node 18 receiving image data sent via reserved bandwidth transfer service communications is observed to see if delays in the transfer of image data do not exceed a prescribed level (266). The delay can be calculated, for example, using send times added to image data when it is transmitted and receive times when the image data is actually received. Send intervals and receive intervals are determined, and the average of the differences between these is compared with a threshold value, to determine the delay. The send time added to the image data upon transmission is the time at which the image data is prepared for transmission to the network 10 and is therefore not the time when it is actually sent to the network 10. The actual transmission of the image data to the network is performed after this and occurs when the network 10 is in a state where the image data can actually be sent. Thus, when there is increased traffic in the network 10, there will be a delay between the actual send time and the send time added to the image data. These delays will gradually accumulate.

The monitor node 18 will detect when the delays exceed a prescribed level and will send a delay report to the bandwidth control manager module 160 of the operation unit 20 (264). This is received by the bandwidth control manager module 160, which broadcasts a request for restricted communication, which includes a list of nodes in which to lower transfer rates and the specified lower transfer rat (268). In this case, the nodes for which the transfer rates are to be lowered are the camera node 30 communicating via the reserved bandwidth transfer service. When the bandwidth control manager module 160 receives the delay report it can immediately issue a request for restricted communications, but it would also be possible to issue the request for restricted communications only if at least a prescribed number of delay reports are received from the monitor nodes 18. Alternatively, a request for restricted communications can be issued if at least a fixed number of delay reports are received within a fixed interval from the monitor nodes.

The camera nodes 30 specified by the communication restriction request for transfer rate reduction (270, 272) drop their transfer rates to the rates indicated in the communication restriction request. The post-reduction transfer rate contained in the communication restriction request can be a specific value (e.g., 30 msec) or a scaling factor for the post-reduction transfer rate relative to the pre-reduction transfer rate (e.g., x0.5). It would also be possible to have the monitor nodes 18 observe variations in the receive time intervals involved in reception of image data, and to have delay reports sent from the monitor nodes 18 when the variations exceed a fixed level. Alternatively, variations in the image data reception intervals at the camera nodes 30 can be monitored, and the delay reports can be sent not from the monitor nodes 18 but from the camera nodes 30 when the variations exceed a fixed level.

Figure 20:
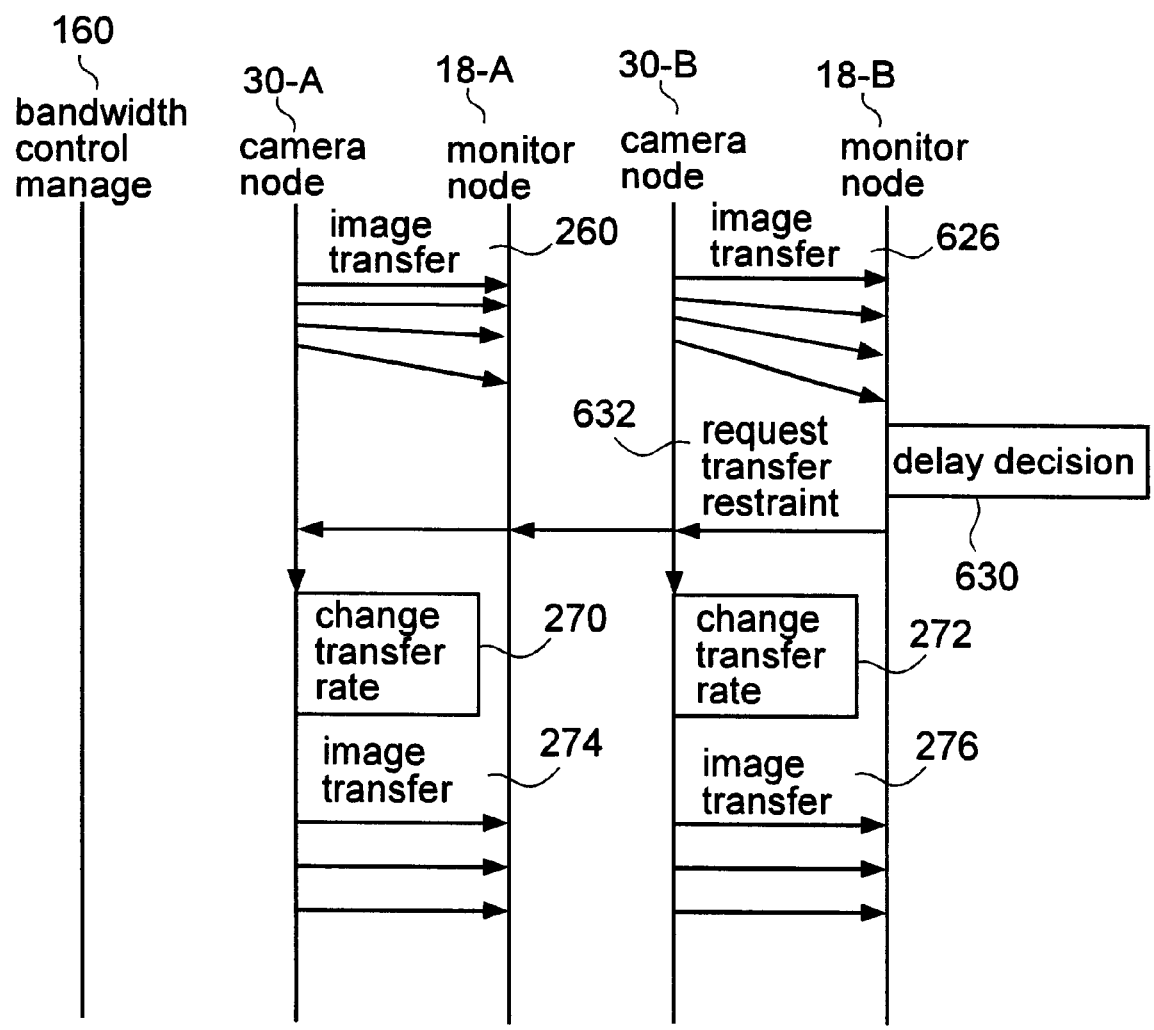
FIG. 20 is a diagram which shows the sequence of operations involved in communication restrictions according to the first embodiment.

Communication restrictions can also be implemented using the sequence shown in FIG. 20 in place of the sequence shown in FIG. 19. In the sequence shown in FIG. 20, when the monitor node 18 detects that the delay has exceeded a certain level (630), the communication restriction request is broadcast not from the operation unit 20 but directly from the monitor 18 (632). In this case, the monitor node 18 must independently keep track of the camera nodes 30 currently performing reserved bandwidth transfer service communications. Out of the list of camera nodes kept by the monitor node, a list of nodes to have transfer rates reduced must be generated for inclusion in the communication restriction request. Alternatively, it would also be possible to not include a list of nodes to have transfer rates reduced in the communication restriction request. Instead, when the communication restriction request is broadcast, the camera nodes 30 performing reserved bandwidth transfer service communications can reduce their transfer rates on their own when they receive the request.

Figure 21:
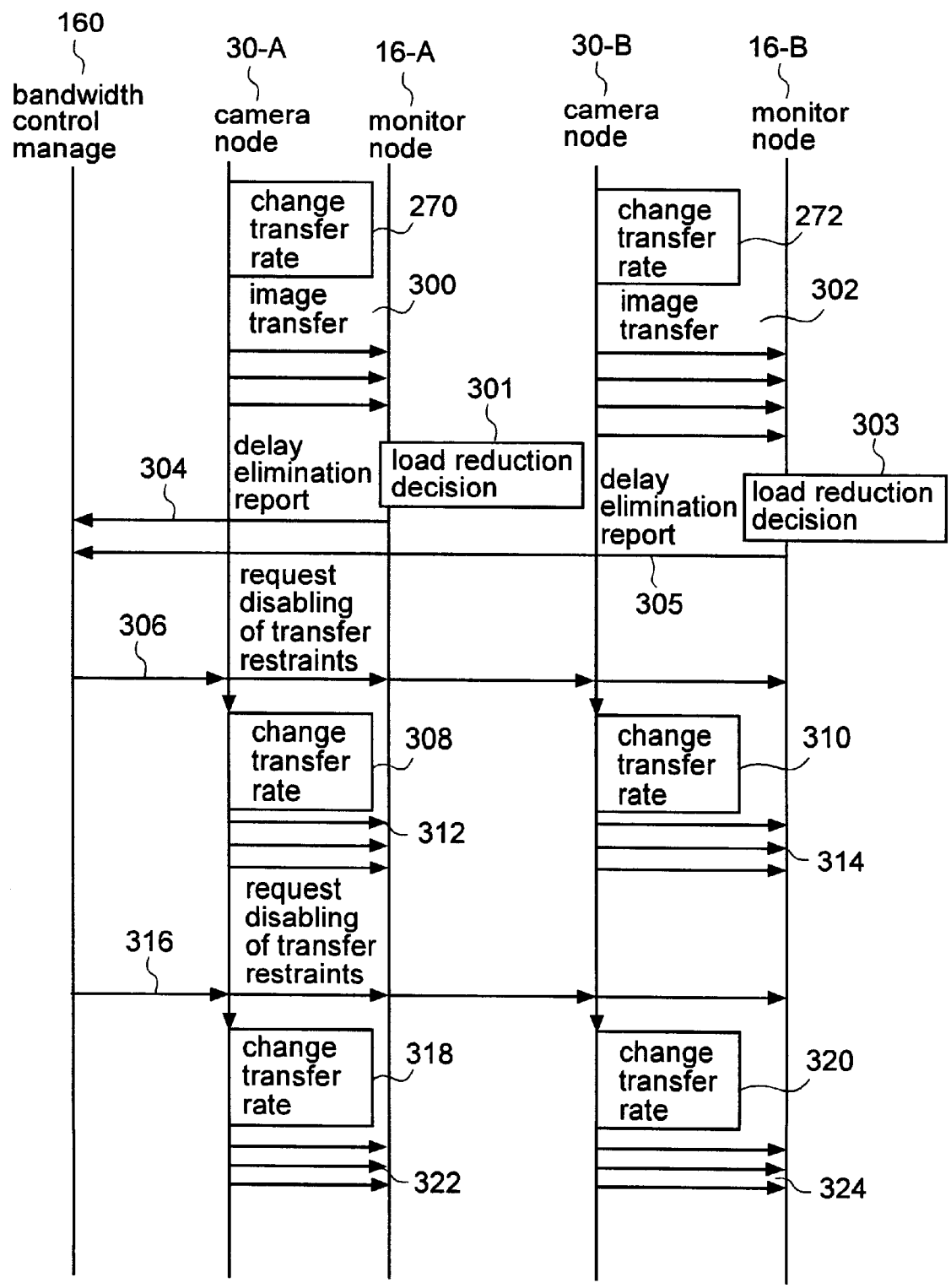
FIG. 21 is a diagram which shows the sequence of operations involved in disabling communication restriction according to the first embodiment.

The following is a description of how restricted communications are disabled. The disabling of restricted communications takes place according to the sequence shown in FIG. 21. Due to restricted communications, a reduced transfer rate (270, 272) is used to transfer image data from the camera node 30-A to the monitor 16-A and from the camera 30-B to the monitor 16-B. The monitor nodes (16-A, 16-B) that have issued delay reports detect when delays have dropped to or below a prescribed level (301, 303) and assume that the network traffic load is reduced. The monitor nodes (16-A, 16-B) then send a delay elimination report to the bandwidth control manager module 160 of the operation unit 20 (304, 405). The bandwidth control manager module 160 receives this delay elimination report and, in order to restore normal data transfers, broadcasts a request to disable transfer restrictions (306). The request to disable transfer restrictions includes a list of nodes for which transfer rates are to be increased as well as post-increase transfer rates. The camera nodes 30 which have been indicated in the communication restriction disabling request for an increase in transfer rate have their transfer rates for image data changed to the specified original values (308, 310), and image data is transferred. The transfer rates for the camera nodes whose rates were reduced by the communication restriction request are restored to the original transfer rate in stages by the bandwidth control manager module 160. Thus, the bandwidth control manager module 160 broadcasts a plurality of communication restriction disable requests (306, 316), separated by intervals, in order to increase the transfer rate in stages until it reaches the original transfer rate. However, if a delay report is received before the transfer rate is increased to the original setting, the issuing of subsequent communication restriction disable requests is canceled and a communication restriction request is issued as before.

Communication restriction disable requests can be issued immediately after the bandwidth control manager module 160 receives a delay elimination report. However, it would also be possible to begin the issuing of communication restriction disable requests once delay elimination reports have been received from a prescribed number of monitor nodes. Alternatively, the issuing of communication restriction disable requests can begin if, within a fixed interval, delay elimination reports are received from at least a prescribed number of monitor nodes.

Figures 22, 23:
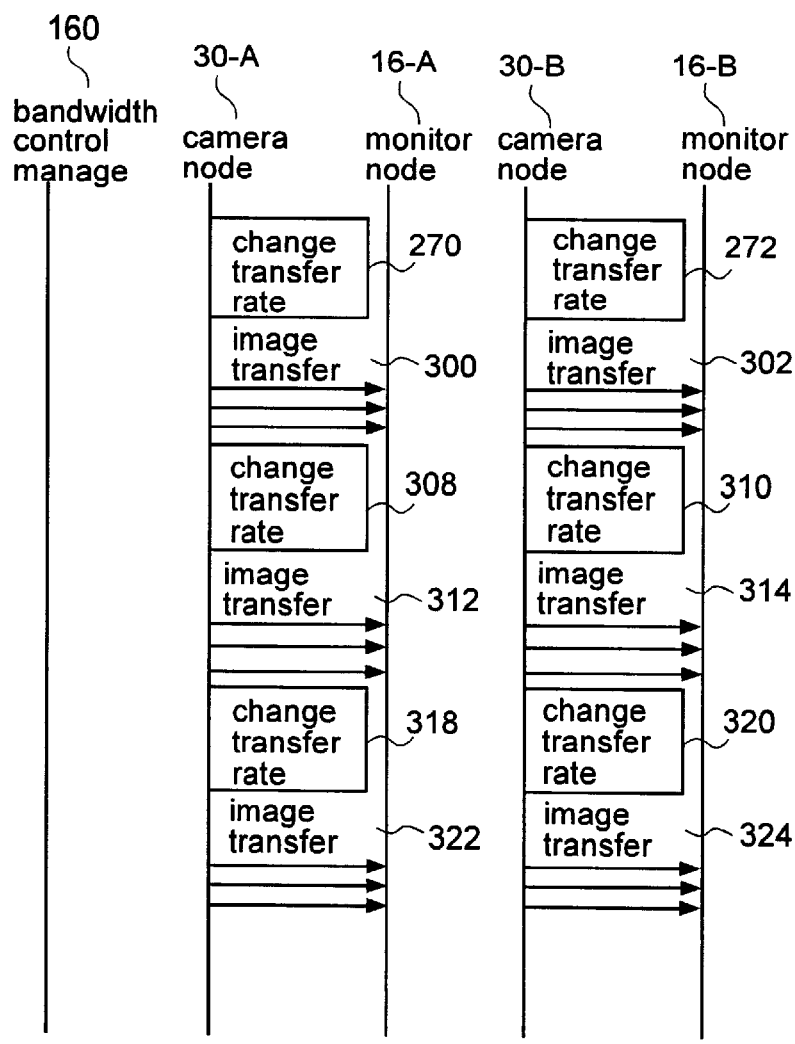
FIG. 22 is a diagram which shows the sequence of operations involved in disabling communication restrictions according to the first embodiment.
FIG. 23 is a diagram which shows the structure of the bandwidth information table according to the first embodiment.

The disabling of communication restrictions can also be performed using the sequence shown in FIG. 22. In the sequence in FIG. 22, the camera nodes (30-A, 30-B), which have had their transfer rates reduced by a communication restriction request, disable communication restrictions by themselves. After the transfer rate is lowered in response to a request for restricted communications (270, 272), the camera nodes 30 activate internal timers. Once a fixed period of time has passed, the transfer rate is increased (308, 310). Then, the timer is restarted; and, after a fixed period of time, the transfer rate is increased again (318, 320). This process of increasing the transfer rate is repeated until the transfer rate is restored to the value that was being used before the transfer rate was reduced by the communication restriction request. By using the sequence of operations for disabling communication restrictions, as shown in FIG. 22, and the sequence of operations for restricting communications, as shown in FIG. 20, the communication restriction feature can be implemented even without a bandwidth control manager module 160.

The following is a detailed description of a surveillance system in which the operations described above are implemented. FIG. 23 shows the contents of a bandwidth information table 154 included in the operation unit 20. The bandwidth information table 154 includes entries for each communication that uses the reserved bandwidth transfer service. For each entry, an area 322 holds an identifier identifying the allocated bandwidth, an area 334 holds the bandwidths used during reserved bandwidth transfer service communications, an area 336,holds the bandwidth used during restricted communications, an area 338 holds the transfer rate used during reserved bandwidth transfer service communications, an area 340 holds the transfer rate used during restricted communications, and an area 342 holds the transfer rate currently being used.

Figure 24A:
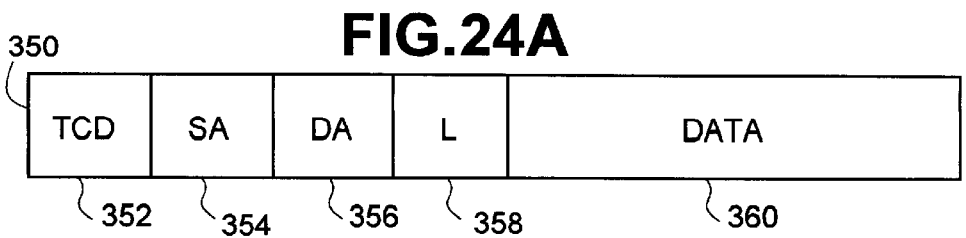
FIG. 24A is a diagram which shows the format for communication data used in the first embodiment.

FIG. 24A shows the communication data format used in communications between the operation unit 20, the camera nodes 30, the monitor nodes 18, and the sensor nodes 60. A data communication 350 is formed as a message packet. Each message packet includes a header and an area 360 for storing a message (data). The header includes an area 352 for setting a transaction code (TCD) that indicates a message type, an area 354 for setting a transfer source address (SA), an area 356 for setting an address for a destination device (DA), an area 359 for setting a data length (L) for the message 360. The transaction codes (hereinafter referred to as "TCD") corresponding to the different message types and the addresses of the various devices are defined beforehand.

The communication module for each device receives message packets that have been broadcast over the network and that either have a TCD that was specified beforehand for reception or that have a destination address (DA) that is the same as the address of the node. Also, message packets that have a destination address (DA) set to a pre-determined value, e.g., "0", are handled as broadcast message packets. Thus, if a communication module of a device needs to broadcast a message, it sends a message packet having a destination address (DA) set to "0" over the network. If a received message packet has a destination address (DA) set to "0", this is received and processed as a broadcast message packet. The receive control modules of the devices process the message packets received by the communication module by sending them to the module corresponding to the TCD value in the message packet.

Figure 24B:
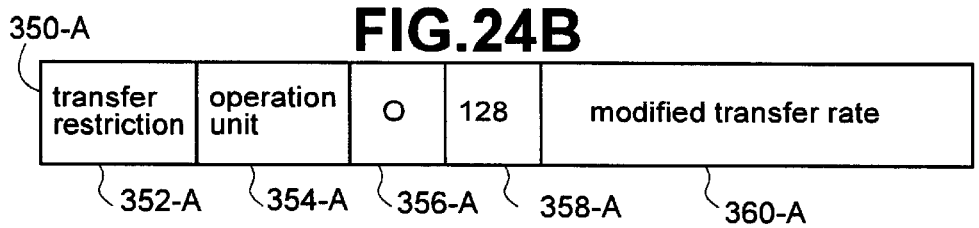
FIG. 24B is a diagram which shows a message packet for communication restriction requests used in the first embodiment.

The following is a description of the contents of the different types of message packet sent using the format described above. First, the contents of the communication restriction request message packet described above will be presented. FIG. 24B shows an example of a communication restriction request message packet 350-A. A TCD 352-A is set to "transfer restriction". An SA area 354-A is set to the address of the operation unit 20 sending the request. A DA area 356-A is set to "0" to indicate broadcasting. A data length L area 358-A is set to "128" bytes. A data area 360-A is set to a restricted transfer rate that is lower than the standard rate, e.g., 30 msec.

Figure 24C:
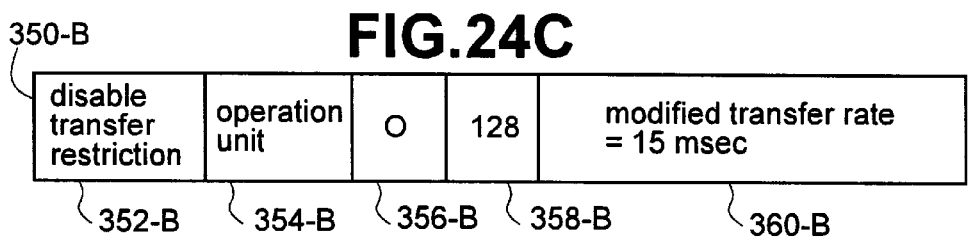
FIG. 24C is a diagram which shows a message packet for requesting disabling of communication restrictions used in the first embodiment.

The following is a description of the contents of a message packet for requesting disabling of restricted transfer. FIG. 24C shows an example of a message packet 350-A for requesting disabling of restricted transfer. A TCD 352-B is set to "disable restricted transfer". An SA area 354-B is set to the address of the operation unit 20 sending this request. A DA area 356-B is set to "0" to indicate broadcasting. A data length L area 358-B is set to "128" bytes. A data area 360-B is set to a transfer rate for disabling transfer restrictions. This transfer rate is higher than the restricted transfer rate, e.g., 15 msec.

Figure 24D:
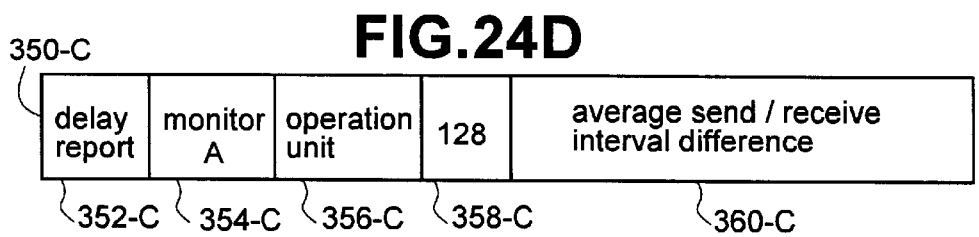
FIG. 24D is a diagram which shows a message packet for delay reports used in the first embodiment.

The following is a description of the contents of a message packet used for delay reports as described above. FIG. 24D shows an example of a delay report message packet 350-C. A TCD 352-C is set to "delay report". An SA area 354-C is set to an address of the monitor node 18 sending this report. A area 356-C is set to the address of the operation unit 20, which is the transfer destination. A message body data length L area 358-C is set to "128" bytes. A data area 360-C is set to the average of differences between send intervals and receive intervals measured by the monitor node.

Figure 24E:
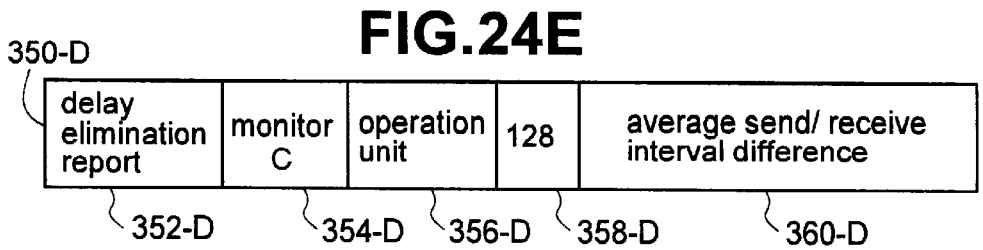
FIG. 24E is a diagram which shows a message packet for delay elimination reports used in the first embodiment.

The following is a description of the contents of a message packet used for the delay elimination reports described above. FIG. 24E shows an example of a delay elimination report message packet 350-D. A TCD 352-D is set to "delay elimination report". An SA area 354-D is set to the address of the monitor node 18 sending this report. A DA area 356-D is set to the address of the operation unit 20, which is the destination to which this report will be sent. A message body data length L area 358-D is set to "128" bytes. A data area 360-D is set to the average of differences between the send intervals and the receive intervals as measured by the monitor node 18.

Figure 24F:
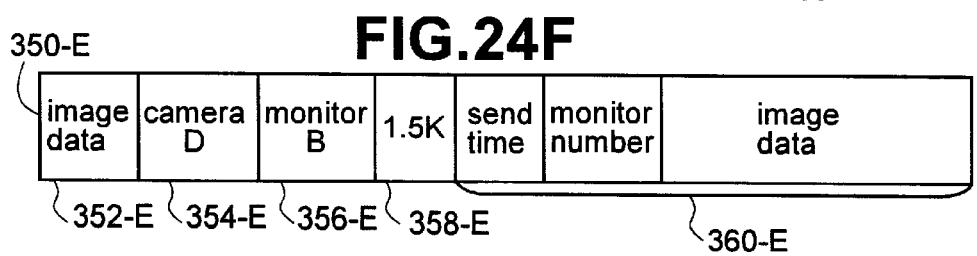
FIG. 24F is a diagram which shows a message packet for image data used in the first embodiment.

The following is a description of the contents of the message packets used for transferring image data from the camera nodes 30 to the monitor nodes 18. FIG. 24F shows an example of image data message packet 350-E. A TCD 352-E is set to "image data". An SA area 354-E is set to the address of the camera node sending this report image data. A DA area 356-E is set to the address of the monitor node 18 that will be the destination of the image data transfer. A message body data length L area 358-E is set to "1.5" kilobytes. A data area 360-E includes a "send time, "which is the time at which this message packet was generated "image data"; and a "monitor number", which is the monitor number of the output destination for the image data.

The message packets used to transfer alarm information from the sensor node 60 to the operation unit 20 have the same format as that shown in FIG. 24F. In this case, the TCD 352-E is set to "alarm information". The SA area 354-E is set to the address of the sensor node 60 sending this report. The DA area 356-E is set to the address of the operation unit 20, which is the destination for the alarm information transfer. The message body data length L area 358-E is set to the length of the alarm information. The data area 360-E holds the alarm information.

Figure 24G:
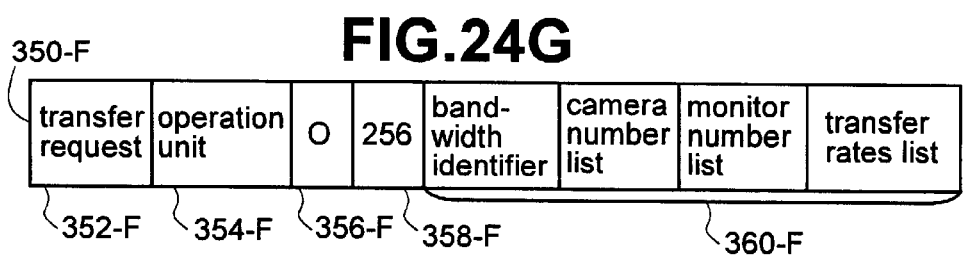
FIG. 24G is a diagram which shows a message packet for requesting reserved bandwidth transfer, requesting statistical multiplex transfer, and requesting emergency transfer used in the first embodiment.

The following is a description of the contents of the message packets for requesting reserved bandwidth transfers, requesting statistical multiplex transfers, and requesting emergency transfers. FIG. 24G shows an example of a message packet 350-F. A TCD 352-F is set to one of "reserved bandwidth transfer," "statistical multiplex transfer," and "emergency transfer." An SA area 354-F is set to the address of the operation unit 20 to which the request will be sent. A DA area 356-F is set to "0", indicating broadcasting. A data length L area 358-F is set to "256" bytes. If the packet is a request for reserved bandwidth transfer, a data area 360-F stores "bandwidth identifiers" assigned to each communication for which the reserved bandwidth transfer service is to be used. A "camera number list" and a "monitor number list" are also stored to indicate the source input devices and the destination output devices for these communications. A "transfer rate list" specifying the transfer rates for each communication is also stored. The N-th element of each list holds the camera number, the monitor number, and the transfer rate of the N-th communication. If the message packet is a request for statistical multiplex transfer data area 360-F holds a "sensor node number list" and an "operation unit number list" to indicate the transfer sources and transfer destinations for each communication in which the statistical multiplex service is to be used. If the packet is an emergency transfer request, the data area 360-F is used to store a "camera number list" and a "monitor number list" specifying the transfer sources and transfer destinations for each communication in which the emergency transfer service emergency transfer service is to be used. The data area 360-F is also used to store a "transfer rate" to indicate a communication transfer rate to be used for the emergency transfer service emergency transfer service. The camera numbers and the monitor numbers are based on identification numbers pre-assigned for each camera and monitor.

Figure 25:
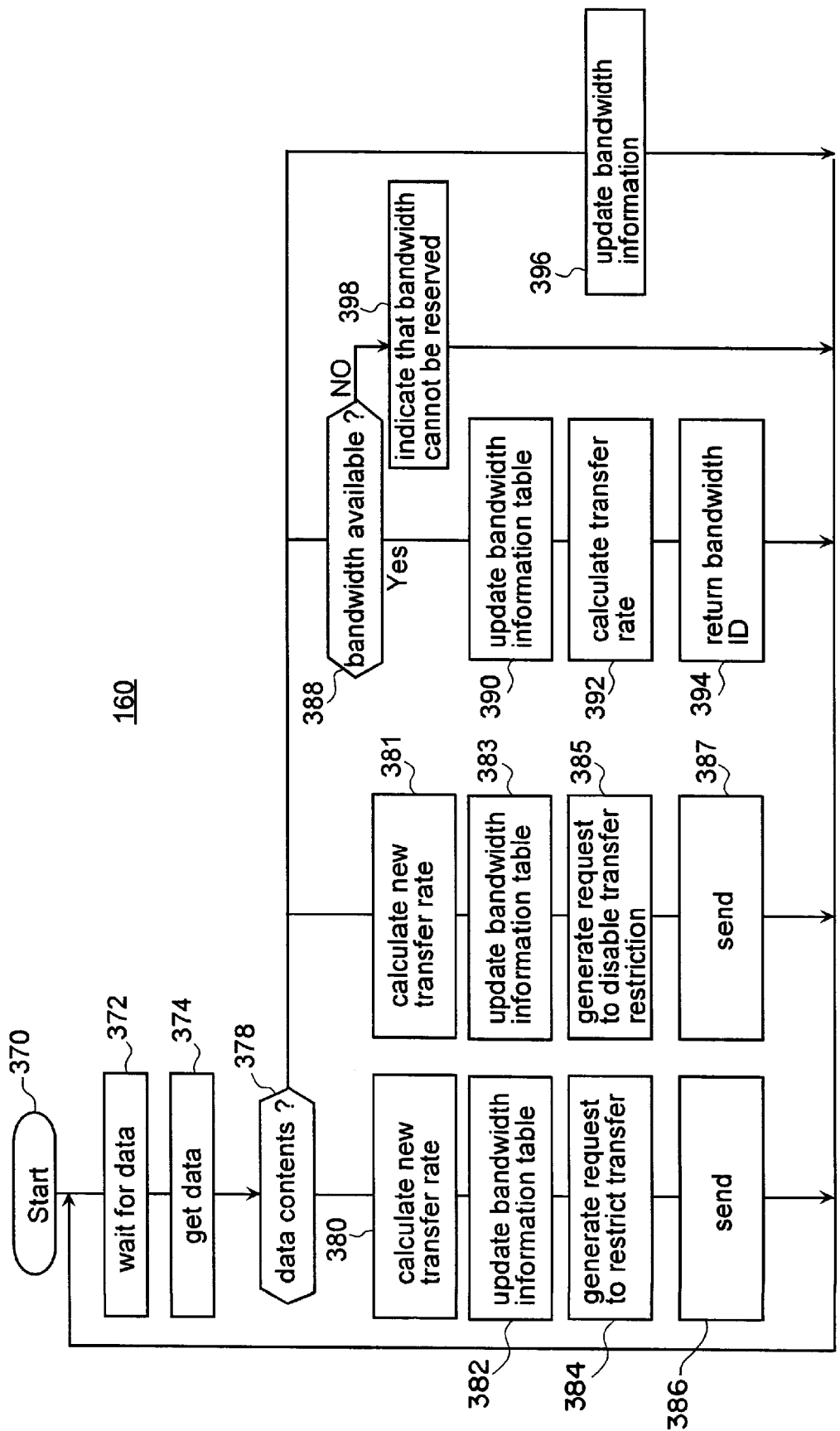
FIG. 25 is a diagram which shows the operations performed by the bandwidth control manager module according to the first embodiment.

The following is a detailed description of how the operation unit 20, the camera nodes 30, the monitor nodes 18, and the sensor nodes 60 operate. First, the operations of the bandwidth control manager module 160 of the operation unit 20 will be described with reference to FIG. 25. When the bandwidth control manager module 160 is started, it enters a state where it waits for data (step 372). A message packet received via the network 10 is passed on from the control module 158 or a request to reserve or release bandwidth is received from the transfer module 156 (step 374). If the message packet is passed on from the receive control module 158, the TCD of the received message packet is checked (step 378). If the TCD indicates "delay report," a restricted transfer rate for reserved bandwidth transfer services is determined by referring to the restricted bandwidth 336, the restricted transfer rate 340, and the active transfer rate 342 of the bandwidth information table 154 (step 380). The active transfer rate 342 of the bandwidth information table 154 is updated to the determined transfer rate (step 382). A message packet for requesting restricted communication, as described above, is generated (step 384) and is sent to the network 10 via the communication module 172 (step 386).

If the evaluation at step 378 indicates that the TCD provides a "delay elimination report", then the restricted bandwidth 336, the restricted transfer rate 340, and the active transfer rate 342 are referred to from the bandwidth information table 154, and a transfer rate for after the disabling of the communication restriction for the reserved bandwidth transfer service is determined (step 381). The active transfer rate 342 of the bandwidth information table 154 is updated (step 383). A message packet for restricting the disabling of communication restrictions, as described above, is generated (step 385) and is sent to the network 10 via the communication module 172 (step 387). However, as described above, the change in transfer rates resulting from this request to disable communication restrictions can take place in stages.

If the evaluation at step 378 determines that a request to reserve bandwidth was received, the bandwidth information table 154 is referred to in order to determine if there is free bandwidth (step 388). If a free bandwidth is available, a new entry is created in the bandwidth information table 154 (step 390), and the active transfer rate 342 is set to the transfer rate to be used for the reserved bandwidth transfer service communication involved in the request (step 392). Then, the bandwidth identifier 332 entered in the newly created entry in the bandwidth information table 154 is returned to the transfer module 156 (step 394). If the evaluation at step 388 determines that no bandwidth is available, an indication that bandwidth cannot be reserved is returned to the transfer module 156 (step 398). If a request to release bandwidth is received at the evaluation at step 378, the entry with the bandwidth identifier contained in the bandwidth reservation request is deleted from the bandwidth information table 156 (step 396).

The following is a description of the operations performed by the transfer module 156 of the operation unit 20.

Figure 26:
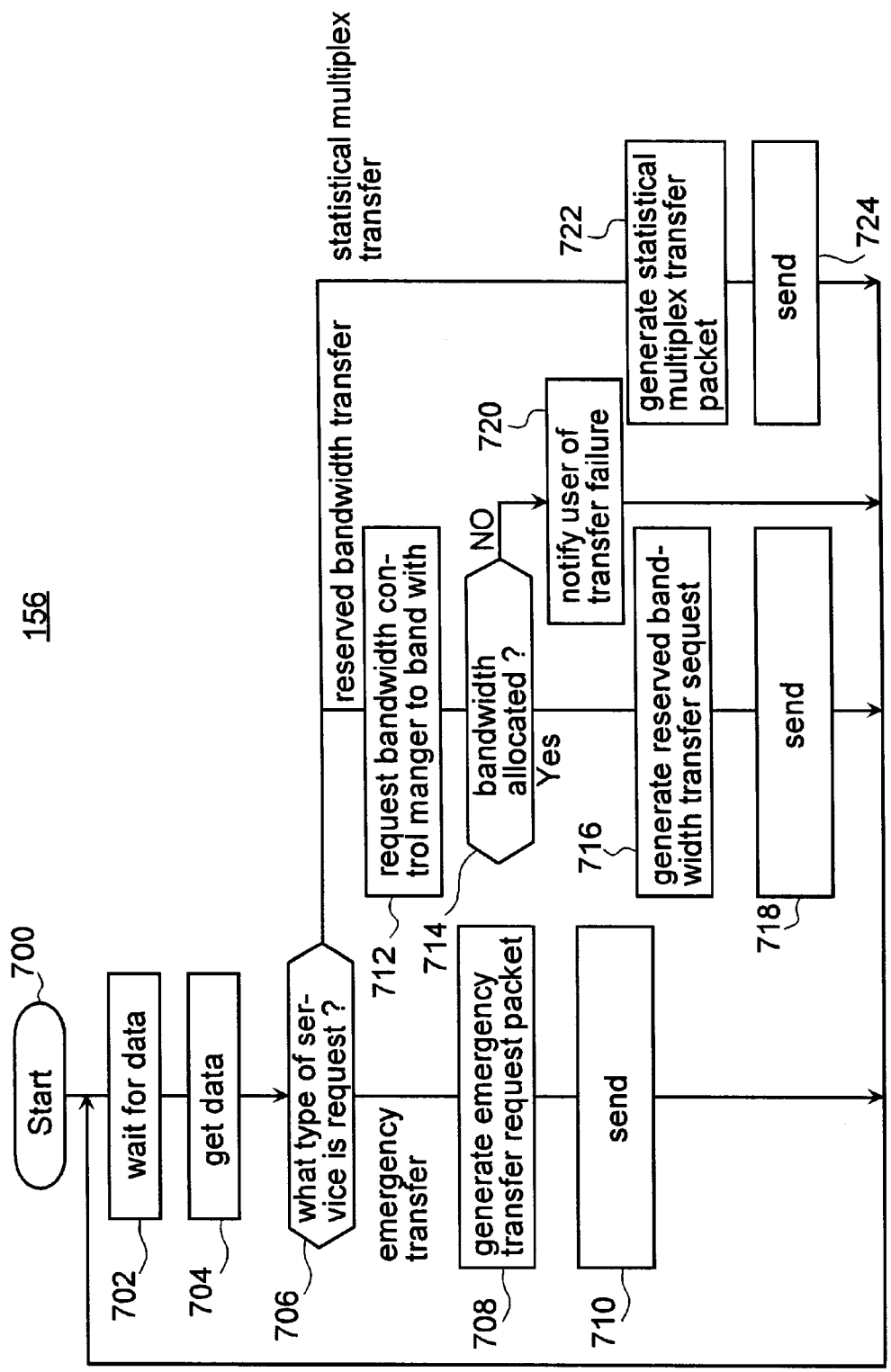
FIG. 26 is a diagram which shows the operations performed by the transfer module of the camera node according to the first embodiment.

FIG. 26 shows the operations performed by the transfer module 156. When the transfer module 156 is activated, it is immediately put in a state where it waits for data (step 702). If there is a request for a transfer service from the user or a user program, it is received along with the transfer service type, source and destination information for the communication to use the transfer service, and the like (step 704). The transfer service type is then determined (step 706).

If the transfer service type is determined to be "emergency transfer," the emergency transfer request message packet described above is generated (step 708) and is sent via the communication module 172 (step 710).

If the transfer service determined at step 706 is "reserved bandwidth transfer," a request for reserved bandwidth is issued to the bandwidth control manager module 160 (step 712) if bandwidth is successfully reserved and a bandwidth identifier is returned (step 714), the reserved bandwidth transfer request packet described above is generated (step 716) and is sent via the communication module 172 (step 718). The transfer module 156 keeps track of the correspondence between the source and destination of the communication using the reserved bandwidth transfer service and the bandwidth identifier returned by the bandwidth control manager module indicating the bandwidth reserved for the communication.

If the transfer service type determined at step 706 is "statistical multiplex transfer," the message packet for requesting statistical multiplex transfer is generated immediately (step 722), and sent via the communication module 172 (step 724).

In addition, if the transfer module 156 receives a request to stop the reserved bandwidth service from the user or a user program along with information, such as the source and destination of the reserved bandwidth service communication to be stopped, then the bandwidth is released as described above by sending this information along with the bandwidth identifier associated with the source and destination to the bandwidth control manager module 160. The message packets are sent from the operation unit 20 using the statistical multiplex service.

Figure 27:
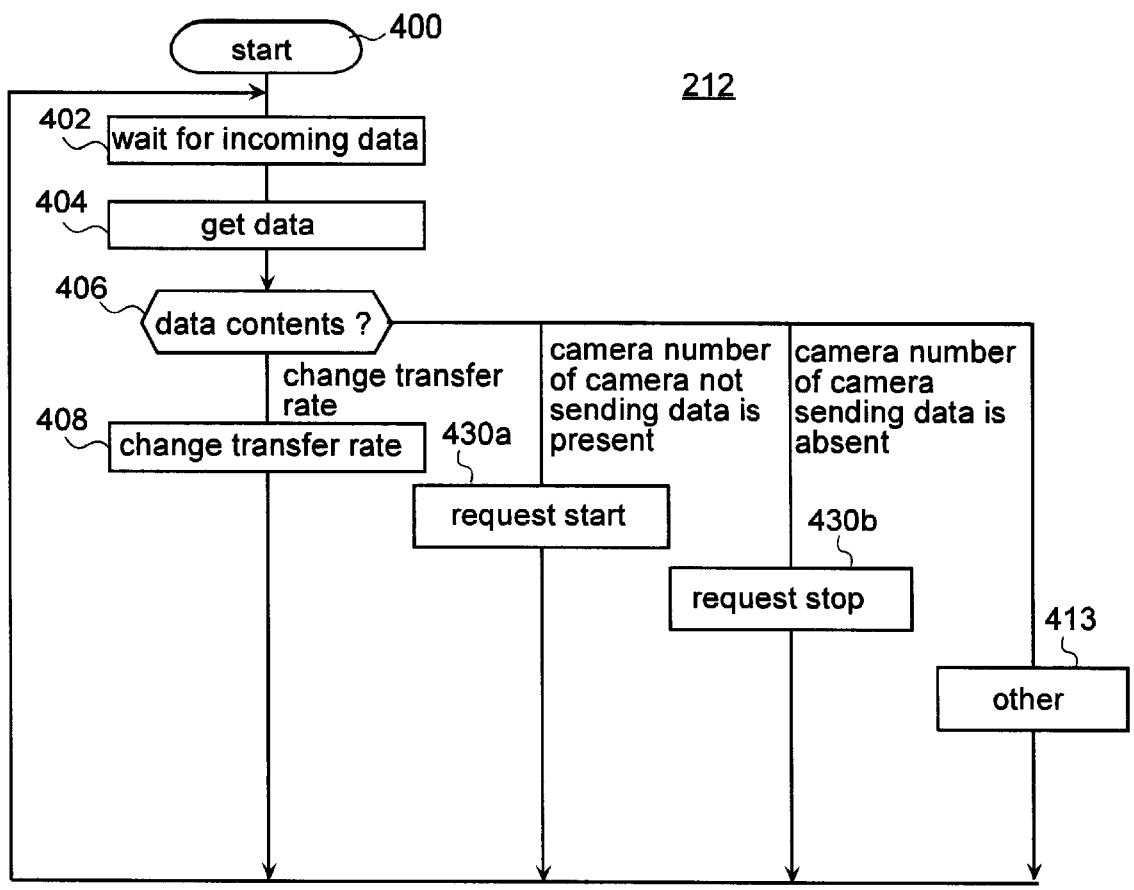
FIG. 27 is a diagram which shows the operations performed by the transfer module of the camera node according to the first embodiment.

The following is a description of the operations performed by the transfer module 212 in the camera node 30. FIG. 27 shows the steps performed by the transfer module 212 of the camera node 30. When the transfer module 212 is activated, it waits for message packets from the receive control module 210 (step 402). If a message packet is received (step 404), its TCD is checked (step 406). If the TCD is "reserved bandwidth transfer," "emergency transfer," "restricted communication," or "disable restricted communication," then the "camera number list" and the "monitor number list" and the "transfer rate list" are referred to (step 406).

If the TCD is either "reserved bandwidth transfer" or "emergency transfer," and if the camera number of the local node, which is not currently sending image data is included in the camera number list, then the transfer rate specified in the "transfer rate list" and the camera number are sent to the transfer rate control module 214, and the camera control module 430 activated and the transfer rate control module 214 is notified that the camera has been start and is informed of the camera number and the transfer rate (step 430a). If the camera of the local node is currently transferring image data and the number of this camera is not included in the camera number list, then a stop request and the camera number are sent to the camera control module 430 and the transfer rate control module 214 (step 430b). Furthermore, if the camera number list includes the camera number of the camera from the local node that is currently transferring image data, and if the transfer rate specified in the "transfer rate list" is different from the transfer rate at which the image data is currently being transferred, then the camera number and the specified transfer rate are sent to the transfer rate control module 214 and the camera control module 216. Also, if the TCD is either "restrict communication" or "disable restricted communication," then the numbers of all of the cameras currently transferring data and the transfer rates indicated in the message packet are sent to the transfer rate control module 214 and the camera control module 216 (step 408).

The camera control module 216 uses video data from the camera indicated by the camera number to generate an image having a level of detail determined by the indicated transfer rate. If a camera number and a transfer rate are received from the transfer module 212, the transfer rate control module 214 uses the indicated transfer rate to select between the send queues 206, 208 to transfer the image data associated with the camera number. If a camera number and a stop request are received, the transfer of image data from the associated camera number is halted.

Figure 28:
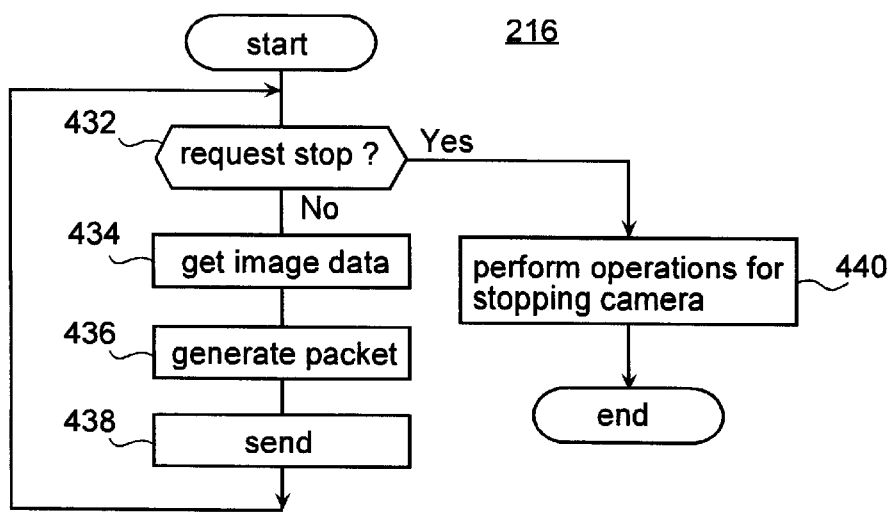
FIG. 28 is a diagram which shows the operations performed by the camera control module of the camera node according to the first embodiment.

The following is a description of the operations performed by the camera control module the camera node 30. FIG. 28 shows the steps performed by the camera control module 216. When the camera control module 216 is activated, it determines whether a stop request or a start request has been received (step 432). If a start request was received, image data is captured from the camera 40 associated with the indicated camera number (step 434), and image data is generated at a level of detail corresponding to the indicated transfer rate. A message packet is generated (step 436) with the destination address DA set to the address of the monitor node 18 of the monitor indicated by the monitor number from the "monitor number list" that is associated with the indicated camera number. The message packet also includes the image data as well as the monitor number and the send time. This message packet is sent via the send queues 206, 208, and the communication module 202 (step 438).

The operations performed from step 434 through step 438 are repeated until a stop request is received. However, if a transfer rate is received, the level of detail of the image data is changed to a level of detail corresponding to the indicated transfer rate. If step 432 determines that a stop request has been received, the generation of image data coming from the camera 40 associated with the indicated camera number is stopped (step 440).

Figure 29:
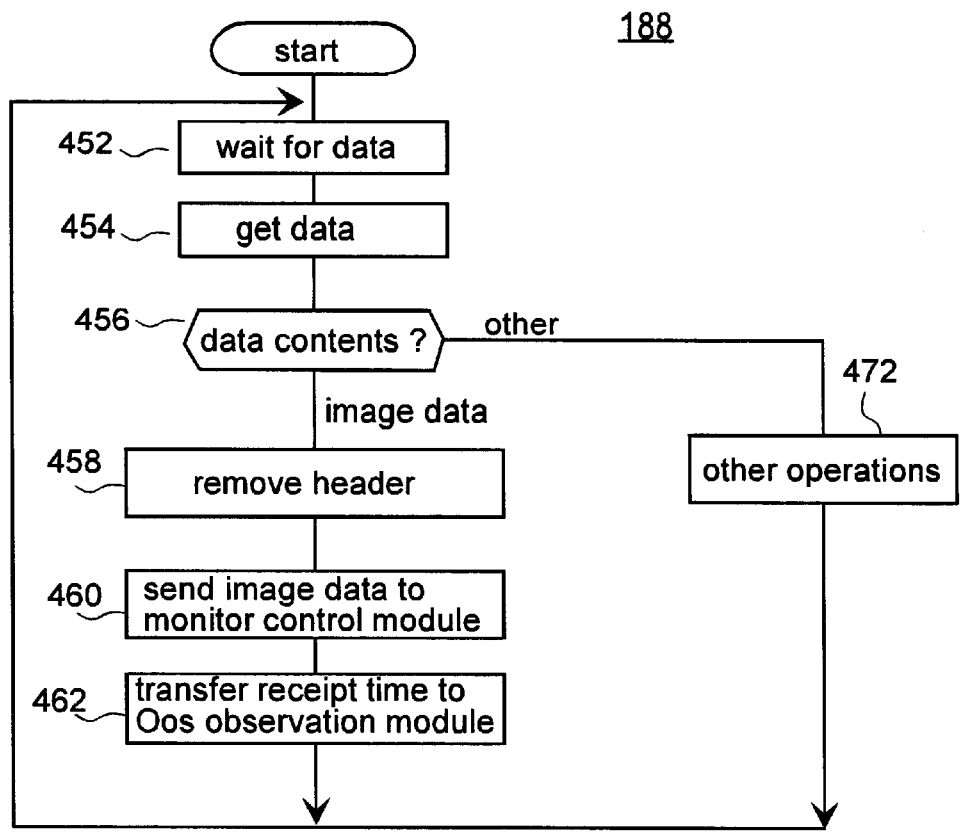
FIG. 29 is a diagram which shows the operations performed by the receive control module of the monitor node according to the first embodiment.

The following is a description of the operations performed by the receive control module 188 of the monitor node 18. FIG. 29 shows the steps performed by the receive control module 188. When the receive control module 188 is activated, it is put in a state where it waits to receive data (step 452). When a message packet is received from the receive control module 202 (step 454), the TCD content is evaluated (step 456). If the TCD indicates image data, the header is removed (step 458), the image data and the monitor number are passed on to the monitor control module 184 (step 460), and the send time is passed on to the quality of service control module 182. The receive time of the message packet is also passed on to the quality of service control module 182 (step 462). The monitor control module 184 takes the received image data and displays it on the monitor associated with the received monitor number.

Figure 30:
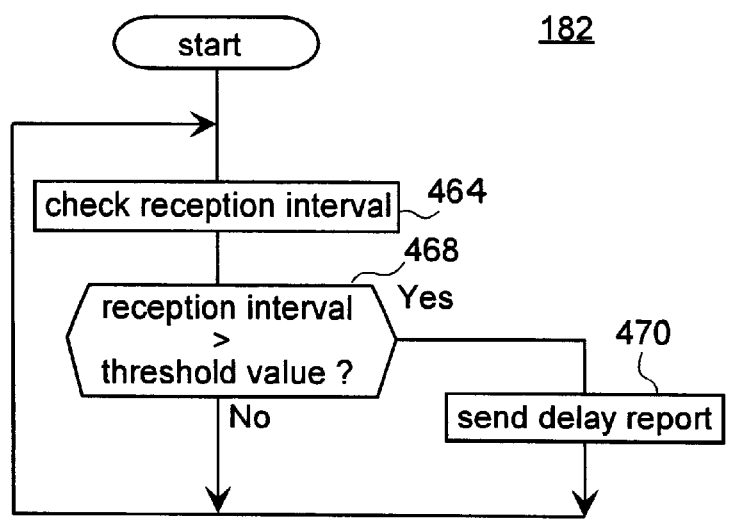
FIG. 30 is a diagram which shows the operations performed by the quality of service observation module of the monitor node according to the first embodiment.

The following is a description of the operations performed by the quality of service observation module 182 of the monitor node 18. FIG. 30 shows the steps performed by the quality of service observation module 182. The quality of service observation module 182 receives the receive time, at which the image data was received from the receive control module 188, as well as the send time affixed to the image data. The quality of service observation module 182 checks the difference between the receive time interval and the send time interval (step 464), and determines whether this difference exceeds a threshold value or not (step 468). If the threshold value is exceeded, a delay report message packet, as shown in FIG. 24D, is generated and sent to the operation unit 20 (step 470). If communication restriction is to be performed according to the sequence shown in FIG. 20, the communication restriction request is broadcast from the monitor node 18 if the evaluation at step 468 indicates that the threshold value has been exceeded.

Figure 31:
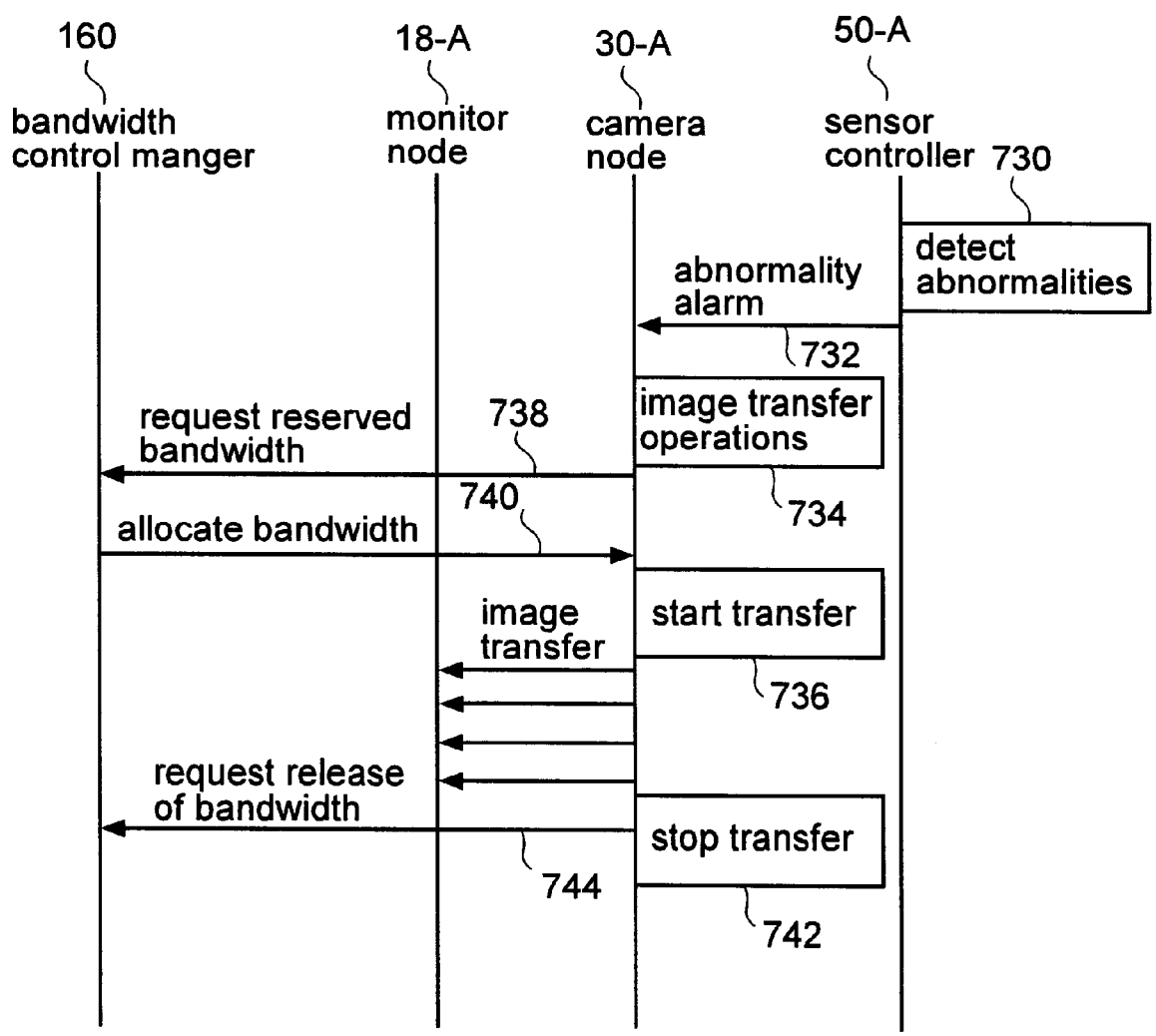
FIG. 31 is a diagram which shows an alternative example of a sequence of operations for communication using the reserved bandwidth transfer service according to the first embodiment.

The foregoing description related to an embodiment of the present invention in which reserved bandwidth transfer service communications are activated by having a request for the reserved bandwidth transfer service entered into the operation unit 20 by a user or a user program. However, reserved bandwidth transfer service communications can also be activated in response to requests issued from nodes wanting to perform reserved bandwidth transfer service communications. For example, the sequence shown in FIG. 31 can be implemented. In FIG. 31, the sensor node 50-A is connected to a sensor that has detected an abnormality. The sensor node 50-A sends an abnormality alarm to the camera node 30-A disposed directly in the vicinity of the sensor node 50-A (732). The transfer module 237 of the camera node 30-A that receives the alarm issues a request for reserved bandwidth to the operation unit 20 via the communication module 222 in order to allow images of the site where the abnormality is taking place, to be sent to a monitor (734). The reserved bandwidth request also includes information such as the transfer rate.

The transfer module 156 of the operation unit 20 sends this request to the bandwidth control manager module 160 (738). If the bandwidth control manager module 160 is able to reserve bandwidth for the transfer rate contained in the reserved bandwidth request, then a message packet indicating that bandwidth has been reserved is sent to the camera node 30-A, which had issued the request for reserved bandwidth (740). The camera node 30-A receives this message packet and sends an image data message packet (736). The transfer of image data message packets from the camera node 30-A can be stopped by setting a timer for automatically stopping data transfer after a fixed period of time following the start of data transfer. Alternatively, image data transfer can stop when a stop transfer command is received from the operation unit 20 based on a user instruction (742). In either case, when the camera node 30-A stops the transfer of message packets, it issues a request to release bandwidth to the bandwidth control manager module 160 of the operation unit 20 (744). The transfer module 156 of the operation unit 20 sends this request to the bandwidth control manager module 160, which then releases the bandwidth assigned to the camera node 30-A.

In the request for reserved bandwidth, the notification that bandwidth has been allocated, and the request to release bandwidth used in the operation described above, the following types of message packets are sent and received.

Figure 32A:
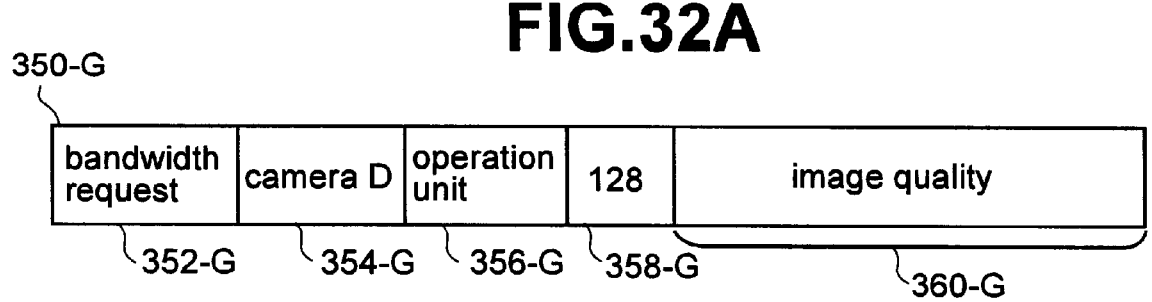
FIG. 32A is a diagram which shows a message packet for requesting reserved bandwidth used in the first embodiment.

FIG. 32A shows an example of the contents of a message packet for requesting reserved bandwidth. In this message packet 350-G; a TCD 352-G is set to "request bandwidth"; an SA area 354-G is set to the address of the camera node that will send this report; a DA area 356-G is set to the address of the operation unit, which is the destination of this message packet; and a message body data length L area 358-G is set to, for example, "128" bytes. Then, the data area 360-G stores the bandwidth that is planned for use by the camera node 30-A to transfer image data. This can be expressed in terms of the quality of the image data to be transferred, e.g., pixel counts or frame rates.

Figure 32B:
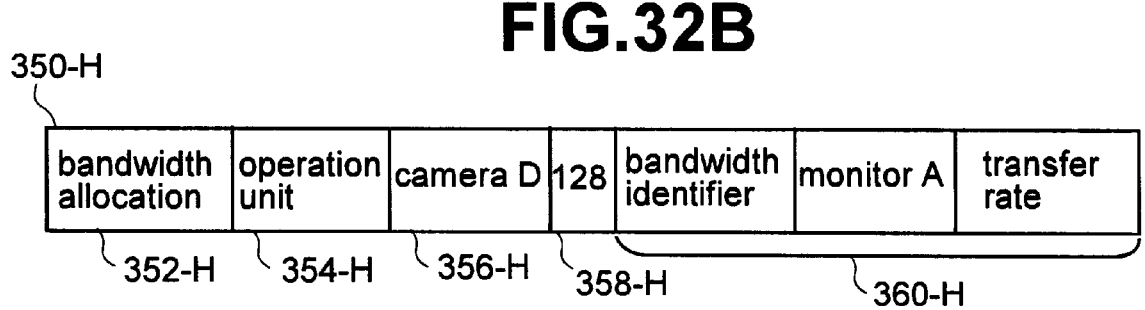
FIG. 32B is a diagram which shows a message packet for indicating bandwidth confirmation used in the first embodiment.

FIG. 32B shows an example of the contents of a message packet used to indicate that the bandwidth has been reserved. In this message packet 350-H: a TCD 352-H is set to "bandwidth reserved"; an SA area 354-H is set to the address of the operation unit 20 sending this report; a DA area 356-H is set to the address of the camera node that is the destination for this data; and a message body data length L area 358-H is set to, for example, "128" bytes. The data area 360-H stores a "bandwidth identifier" of the bandwidth assigned in response to the request for reserved bandwidth from the camera node, a "transfer rate" for sending the image data from the camera node, and a monitor number where the image data will be sent.

Figure 32C:
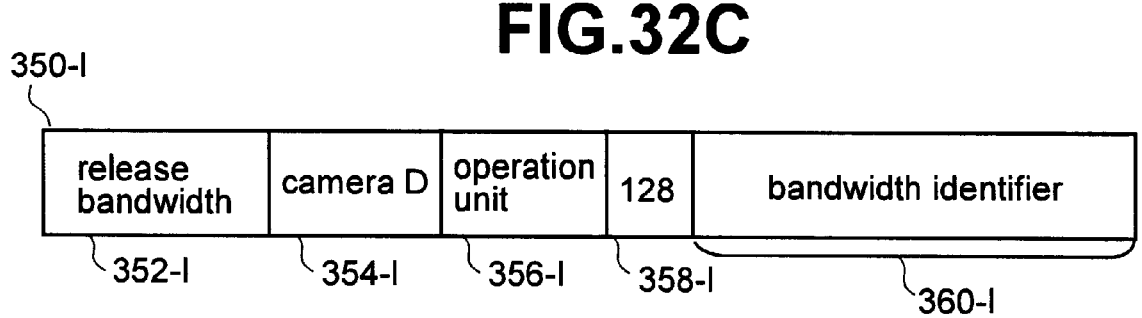
FIG. 32C is a diagram which shows a message packet used for requesting release of bandwidth used in the first embodiment.

FIG. 32C shows an example of the contents of a message packet for requesting release of bandwidth. In this message packet 350-1: a TCD 352-1 is set to "release bandwidth"; an SA area 354-1 is set to the address of the camera node issuing this request; a DA area 356-1 is set to the address of the operation unit 20, which is the destination of the request; a message body data length L area 358-1 is set, for example, with "128" bytes. A data area 360-1 holds the bandwidth identifier of the bandwidth to be released.

In the embodiment described above, when communication is restricted, reserved bandwidth transfer service communications are subject to communication restrictions, i.e., transfer rate reductions. However, depending on the purpose of the surveillance system, e.g., if the image data is especially important, it would also be possible to have communication restrictions applied to statistical multiplex transfer service communications instead. In this case, the nodes which act as transfer sources for statistical multiplex transfer services would have their transfer rates reduced by the amount indicated in the communication restriction request.

Also, in the embodiment described above, when communications are restricted, all reserved bandwidth transfer service communications are subject to communication restrictions. However, it would also be possible to change this so that only some of the reserved bandwidth transfer service communications are subject to communication restrictions. For example, it would be possible to have communication restrictions applied only for reserved bandwidth transfer service communications taking place in one or a plurality of nodes specified beforehand by the user.

As described above, according to the first embodiment, a reserved bandwidth transfer service is used to assign fixed bandwidths to individual communications that generate transfer data in a uniform manner. For communications in which transfer data is generated in a nonuniform manner, a statistical multiplex transfer service is used to assign a fixed bandwidth to all such communications rather than to individual communications. This allows the bandwidth of the entire network to be used efficiently. Also, by restricting communications in response to network traffic, the bandwidth used by communications involving data that is not as important can be dynamically reduced, thus preventing delays or data loss in, communications involving more important data.

The following is a description of a second embodiment of the present invention. In the first embodiment, the monitor node 18 that receives image data determines network traffic based on the delay of the image data using the send time affixed to the image data by the camera node 30 and the actual receive time of the image data by the monitor node 18. The monitor node 18 applies and disables communication restrictions based on this. However, depending on the structures and features of the monitor nodes 18 and the camera nodes 30, this method may not allow network traffic to be correctly assessed. For example, there may be delays unrelated to network traffic due to processing within the camera node 30 taking place between the time when the camera control module 216 of the camera node, 30 adds the send time to the image data and the time when the image data is actually sent out over the network. Alternatively, there may be delays unrelated to network traffic due to processing within the monitor node 18 taking place between the time when the monitor node 18 receives the image data and the time when the receive control module 188 evaluates the receive time. In such cases, the monitor node 18 will not be able to correctly assess the network traffic. For example, the camera control module 216 of the camera node 30 and the receive control module 188 of the monitor node 18 perform operations which are executed as single tasks on the CPU in the respective nodes. If there are a plurality of tasks in a node, the camera control module 216 and the receive control module 188 will be scheduled so that they are switched with other tasks within the processing capabilities of the CPU. Thus, if the processing load for other tasks that need to be executed increases, delays can occur between the time when the image data is actually sent or received and the time when the image data is processed by a task within the camera control module 216 or the receive control module 188. In such cases, the processing delays within the nodes are included in the detected image data delays, and this prevents the network traffic from being correctly assessed. The second embodiment provides a more accurate and detailed assessment of network traffic and allows the bandwidth used for communications by the nodes to be controlled more efficiently and in a more detailed manner.

Figure 33:
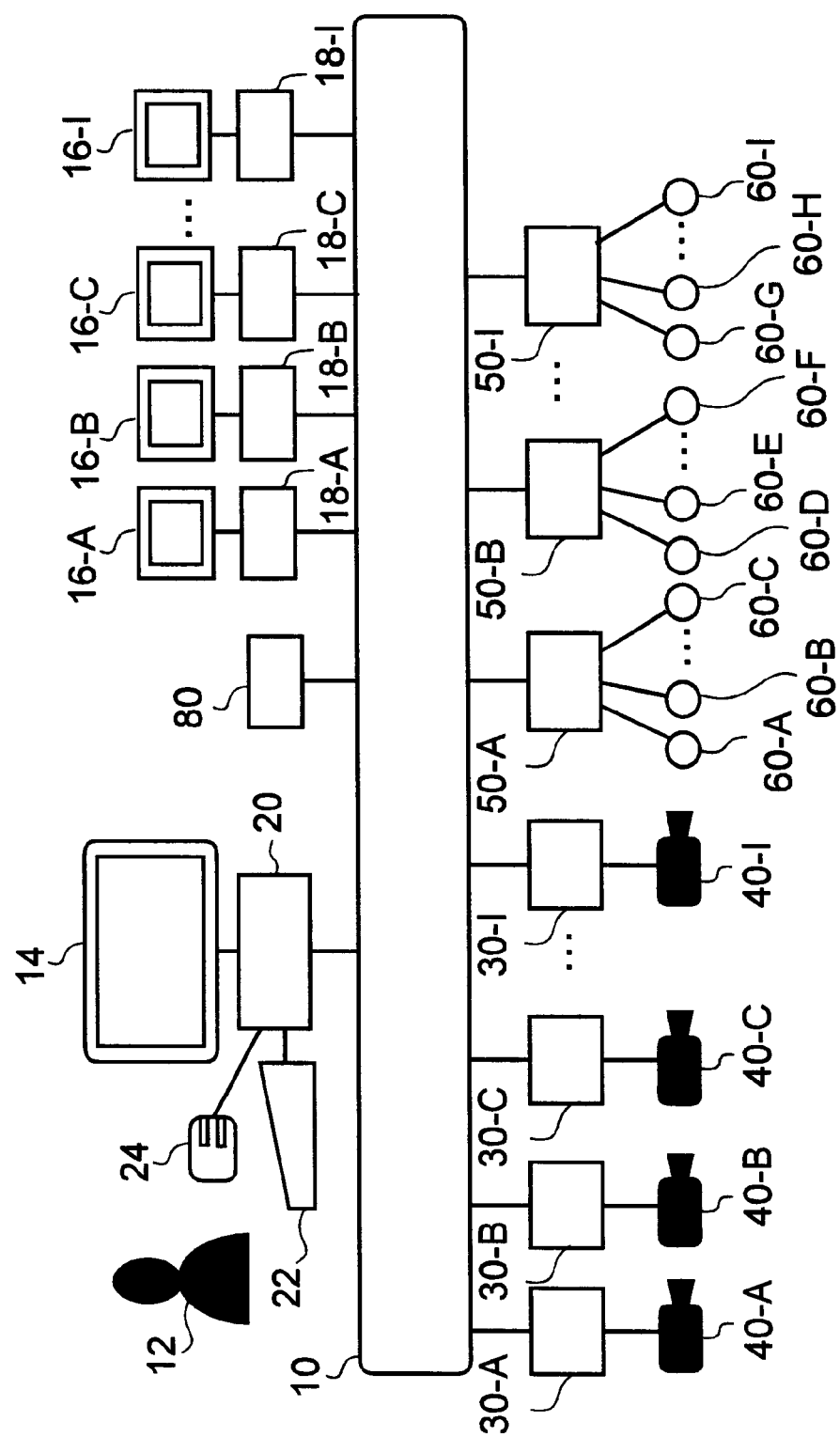
FIG. 33 is a block diagram which shows the structure of an image surveillance system according to a second embodiment.

FIG. 33 shows the structure of a surveillance system according to the second embodiment. The surveillance system shown in the figure is the same as the surveillance system shown in FIG. 1 with the addition of a bandwidth controller node 80 connected to the network 10. Elements other than the bandwidth controller node 80 are similar to those shown in FIG. 1. The hardware structures of the operation unit 20, the monitor nodes 18, the camera nodes 30, and the sensor nodes 50 are similar to those shown and described for the first embodiment. Thus, in the following description, the descriptions of elements having the same structures as those in the first embodiment will be omitted, and the description will center on the differences.

Figure 34:
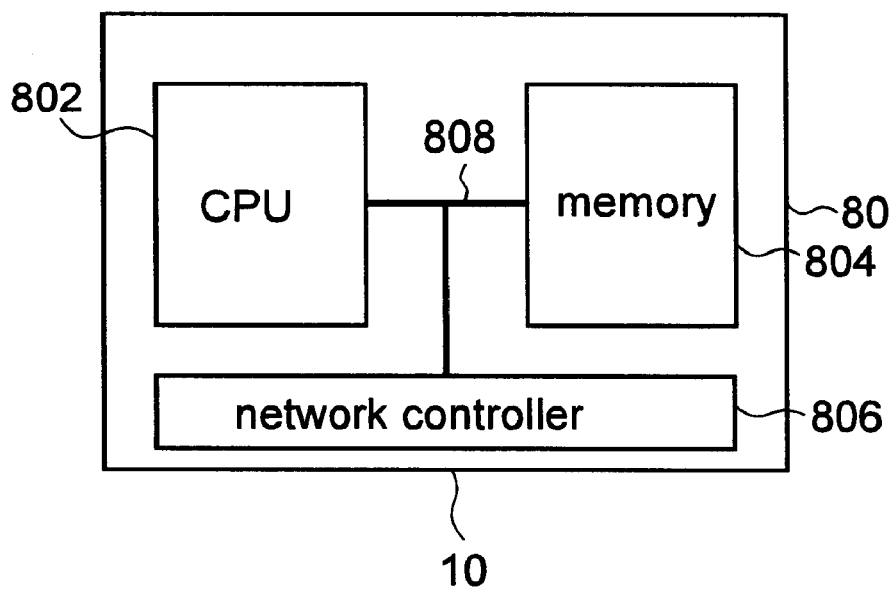
FIG. 34 is a block diagram which show the hardware structure of the bandwidth controller node according to the second embodiment.

As shown in FIG. 34, the bandwidth controller node 80 has a hardware structure in which a bus 808 connects a CPU 802, a memory 804, and a network controller 806. The network controller 806 is structured so that it captures all packets flowing through the network 10. For example, if the network is an Ethernet network, the network controller 806 receives packets in promiscuous mode, thus allowing the network controller 806 to capture all packets on the Ethernet. In this embodiment, the bandwidth control manager module 160 shown in FIG. 6 sends the bandwidth controller node 80 the bandwidth information table 154, which indicates the transfer service type, reserved bandwidth information, and the like for each communication. The bandwidth control manager module 160 has the bandwidth controller node 80 apply and disable communication restrictions based on the bandwidth information table.

Figure 35:
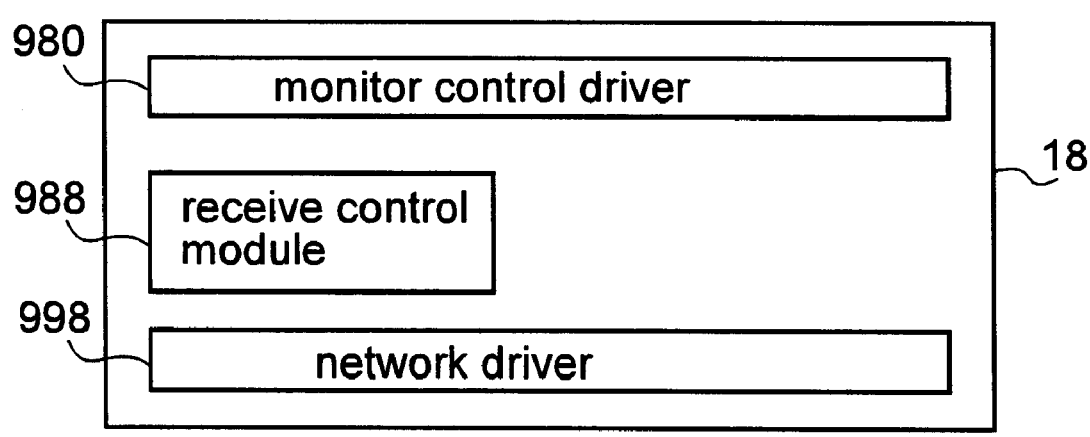
FIG. 35 is a diagram which shows the software structure of the monitor node according to the second embodiment.

FIG. 35 shows the software structure of the monitor node 18. This software structure is implemented in the monitor node 18 by having the CPU 122 execute a program stored in the memory 124, thus providing the monitor node 18 with the functions described below. The software structure of the monitor node 18 includes a communication driver 998; a monitor control driver 980; and a receive control module 988. The communication driver 998 controls the network controller 126. The receive control module 988 processes incoming data. Image data received by the monitor node 18 is sent from the receive control module 988 to the monitor control driver 980, which displays the image data on the monitor 16.

Figure 36:
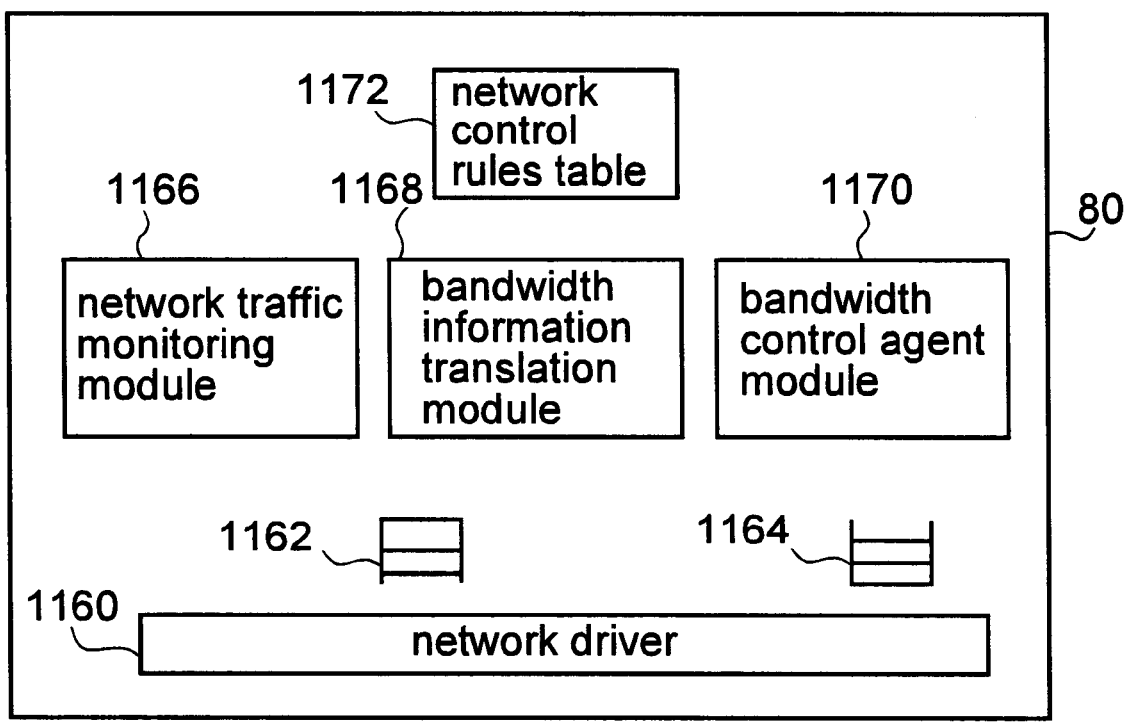
FIG. 36 is a diagram which shows the software structure of the bandwidth controller node according to the second embodiment.

FIG. 36 shows the software structure used in the bandwidth controller node 80. This software structure is implemented in the bandwidth controller node 80 by having a program stored in the memory 804 executed by the CPU 802, thus providing the bandwidth controller node 80 with the functions described below. The software structure of the bandwidth controller node 80 includes a communication driver 1160; a receive queue 1162; a send queue 1164; a network traffic monitoring module 1166; a bandwidth information translation module 1168; a bandwidth control agent module 1170; and a network control rules table 1172.

The communication driver 1160 controls the network controller 806 and carries out the sending and receiving of messages. The receive queue 1162 is used for the receiving of messages. The network traffic monitoring module 1166 captures the messages flowing through the network 10 received by the communication driver 1160. The bandwidth usage for each transfer service type is calculated and the bandwidth control agent module 1170 is activated if necessary. The bandwidth information translation module 1168 translates the contents of the bandwidth information table 154 sent from the bandwidth control manager module 160 of the operation unit 20. The results ate then stored in the network control rules table 1172. The bandwidth control agent module 170 takes the bandwidth usage rates calculated by the network traffic observation module 1166 for each transfer service type and compares it with the contents of the network control rules table 1172. Communication restrictions are enabled and disabled based on the results of this comparison.

As with the first embodiment, the second embodiment performs communications using three transfer service types: "reserved bandwidth transfer service," "statistical multiplex transfer service," and "emergency transfer service." The following is a description of the sequence of operations performed for each type of transfer service.

Figure 37:
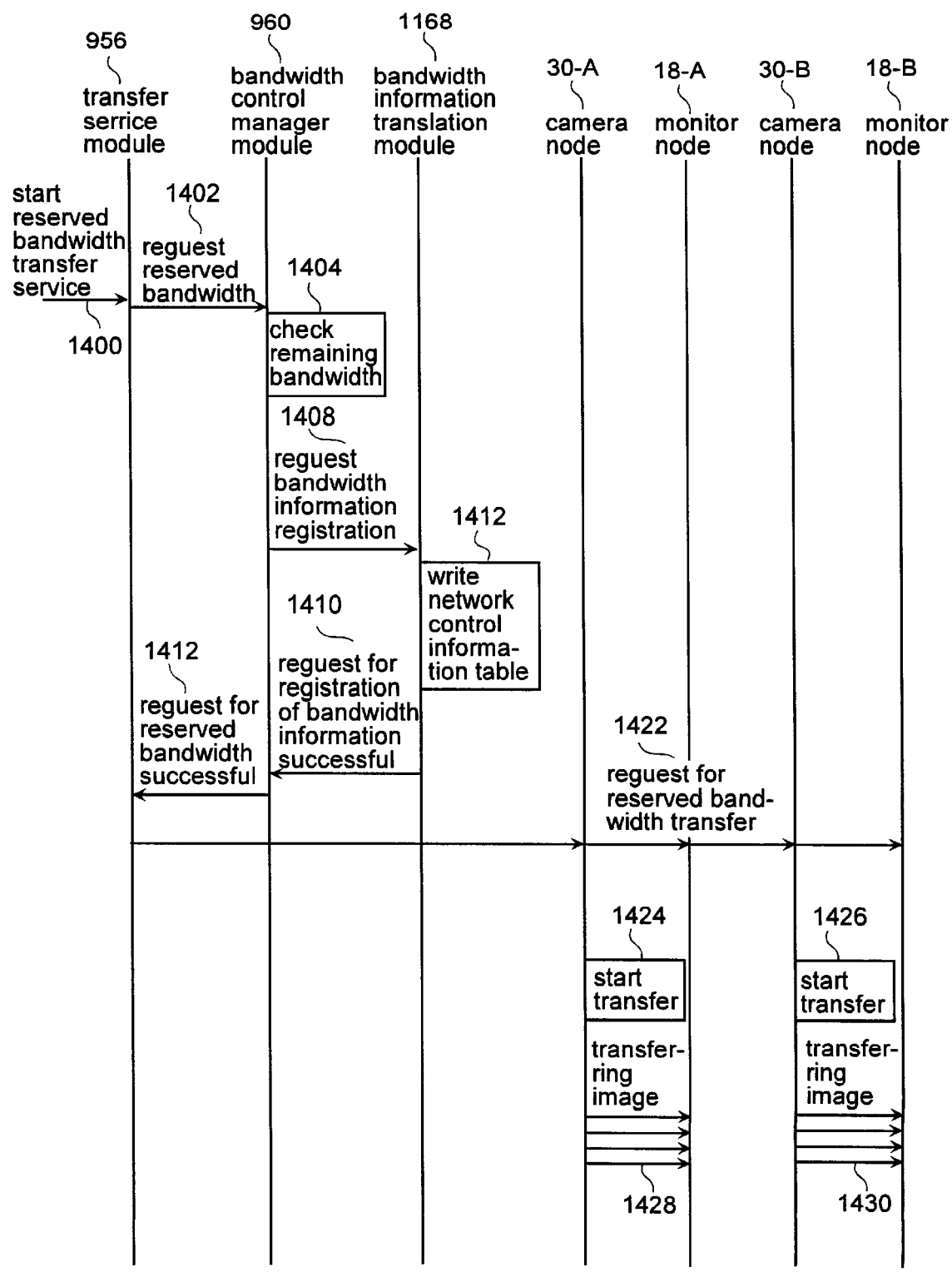
FIG. 37 is a diagram which shows the communication sequence involved in the reserved bandwidth transfer service according to the second embodiment.

First, communication using the reserved bandwidth transfer service will be described. As shown in FIG. 37, when communication using the reserved bandwidth transfer service is to be performed, an instruction to run the reserved bandwidth transfer service, along with a node for which reserved bandwidth transfer service communication is to be performed, is issued via a user selection or from a prescribed user program (1400). The transfer module 156 issues a request to reserve bandwidth to the bandwidth control manager module 160 (1402). The bandwidth control manager module 160 checks to see if there is available bandwidth that can be used for reserved bandwidth transfer service communication. Since the reserved bandwidth is controlled by the bandwidth information table 154, the bandwidth control manager module 160 uses this table to determine the available bandwidth when the instruction to run the reserved bandwidth transfer service is issued. As described above, the bandwidth controller node 80 monitors the bandwidth usage for each transfer service type. Thus, it would also be possible to determine if bandwidth is available for the reserved bandwidth transfer service communication by querying the bandwidth controller node 80 as to whether there actually is available bandwidth at that point in time.

If it is found that there is no available bandwidth, the bandwidth control manager module 160 notifies the transfer module 156 of this. The transfer module 156 indicates to the user requesting the reserved bandwidth transfer service or to the prescribed user program that the execution of the reserved bandwidth transfer service failed. If bandwidth is available, the bandwidth control manager module 160 assigns the empty bandwidth for the communication of the node specified for the reserved bandwidth transfer service, and the communication for the node is entered in the bandwidth information table 154.

FIG. 38 shows the contents of the bandwidth information table 154. As shown in the figure, communications by nodes that use transfer services are entered in the bandwidth information table 154. That contents of the entries include: the communication node that is the source node of the communication; the transfer service type used for the communication; the priority of the communication; the reserved bandwidth for the communication; and the bandwidth identifier of the bandwidth used for the communication.

In the transfer service types in the figure, RS indicates the reserved bandwidth transfer service, ES indicates the emergency transfer service, and SS indicates the statistical multiplex transfer service. In the priority fields, BE indicates that the communication should be allocated the maximum bandwidth allowed by the available bandwidth while being at or less than the bandwidth entered in the reserved bandwidth field. MN indicates that other communications should be stopped and that the bandwidth indicated in the reserved bandwidth field should be allocated for the communication. AB indicates that the bandwidth entered in the reserved bandwidth field should always be allocated. In the reserved bandwidth field, the numerical values indicate the bandwidth represented by the values. ALL indicates the entire bandwidth of the network 10. ANY indicates any bandwidth.

In this embodiment, reserved bandwidth transfer service communications (communications using the transfer service type RS) are assigned a priority BE and the bandwidth assigned by the bandwidth control manager module 160 is entered in the reserved bandwidth field. For emergency transfer service communications (communications of the transfer service type ES), the priority is MN and the reserved bandwidth is ALL. For statistical multiplex transfer service communications (communications of the transfer service type SS), the priority is AB and the reserved bandwidth is ANY.

Going back to FIG. 37, when a node for which reserved bandwidth transfer service is specified is entered in the bandwidth information table 154, the contents of the bandwidth information table 154 are sent to the bandwidth controller node 80 and a request for bandwidth information registration is issued (1408). The bandwidth information translation module 1168 of the bandwidth controller node 80 receives the bandwidth information registration request 1408 and the bandwidth information table. This information is translated and entered in the network control rules table 1172 in the form of control rules needed to control the communication bandwidth according to the contents specified in the bandwidth information table (1412). When this registration succeeds, the bandwidth information translation module 1168 returns an indication that the bandwidth information registration request was successful to the bandwidth control manager module of the operation unit 20 (1410). The bandwidth control manager module 160 receives the bandwidth information registration request success notice 1410 and notifies the transfer module 156 that the reserved bandwidth request was successful (1412). The transfer module 156 broadcasts a request for reserved bandwidth transfer based on the bandwidth information table 154. The request includes a list of nodes communicating via the reserved bandwidth transfer service, a list of communication transfer rates based on the bandwidth assigned to each reserved bandwidth communication, and a list of bandwidth identifiers assigned to each node using reserved bandwidth transfer service communications. The camera nodes 30 specified in the request for reserved bandwidth transfer receive the request and start image transfer to the monitor nodes 18 based on the transfer rates specified in the request (1424, 1426). The camera nodes 30 that have started image transfers continue transferring images until the next request is received (1428, 1430). The format of the messages used to transfer image data is similar to the format used for the first embodiment (see FIG. 24F) with the addition of the bandwidth identifier assigned to the reserved bandwidth transfer service communication being used at the local node.

The following is a description of communications using the statistical multiplex transfer service. With communications using the statistical multiplex transfer service, a user selection or a prescribed user program in the operation unit 20 issues an instruction to run the statistical multiplex transfer service. This instruction is issued along with a specification of a node for which statistical multiplex transfer service communication is to be performed. The bandwidth control manager module 160 receives this and enters the communication for this node into the bandwidth information table 154. The contents of the bandwidth information table 154 are sent to the bandwidth controller node 80 and a request is made to have bandwidth information registered.

The bandwidth information translation module 1168 of the bandwidth controller node 80 receives this bandwidth information registration request and the bandwidth information table. This information is translated and control rules needed to perform bandwidth controls for the communications. According to the contents specified in the bandwidth information table are registered in the network control rules table 1172. Then, when this registration is completed successfully, the bandwidth information translation module 1168 returns an indication that the request for registration of bandwidth information was successful to the bandwidth control manager module 160 of the operation unit 20. The bandwidth control manager module 160 receives this notification and notifies the transfer module 156 that the registration of the statistical multiplex transfer was successful. The transfer module 156 returns an indication to the user or the prescribed user program that the statistical multiplex transfer service has been started successfully.

As With the first embodiment (see FIG. 17), the transfer module 156 uses the bandwidth information table 154 and broadcasts a statistical in multiplex transfer request, which includes a list of nodes for which statistical multiplex transfer service communication is to be performed as well as a list of bandwidth identifiers assigned to the nodes using the statistical multiplex transfer service. If an abnormality is detected by the sensor 60, the sensor node for which the statistical multiplex transfer service has been requested sends alarm information to the operation unit 20 using the maximum possible transfer rate. The message format used to transfer the alarm information is similar to the format used in the first embodiment (see FIG. 24F), with the addition of a bandwidth identifier assigned to the statistical multiplex transfer service communication at the local node. The maximum possible transfer rate referred to here corresponds to the bandwidth that can be used by the sensor node 50 according to the protocol used in the network 10.

The following is a description of communications using the emergency transfer service. When the camera nodes 30-A, 30-B are transferring image data using the reserved bandwidth transfer service, a user selection or a prescribed user program commands that a request be issued for running the emergency transfer service. Along with the request, identification of the nodes for which the emergency transfer service is to be used are issued. The bandwidth control manager module 160 receives this information via the transfer module 156, and the communications for these nodes are registered in the bandwidth information table 154. The contents of the bandwidth information table 154 are sent to the bandwidth controller node 80, and a request is made to register bandwidth information.

The bandwidth information translation module 1168 of the bandwidth controller node 80 receives the bandwidth information registration request and the bandwidth information table. This information is translated, and control rules needed for controlling the bandwidths of the various communications according to the contents indicated in the bandwidth information table are registered in the network control rules table 1172. When this registration is completed successfully, the bandwidth information translation module 1168 returns an indication that the bandwidth information registration request was successful to the bandwidth control manager module 160 of the operation unit 20. When the bandwidth control manager module 160 receives the indication that the request for registration of bandwidth information was successful, it notifies the transfer module 156 that the registration of emergency transfer was successful. The transfer module 156 returns an indication to the user or the prescribed user program that the emergency transfer service was started successfully.

As with the first embodiment (see FIG. 18), the transfer module 156 broadcasts an emergency transfer request, which includes a list of nodes for which data transfers are to be stopped, a list of bandwidth identifiers that are assigned to the communications that are to be stopped, identification of the nodes for which emergency transfer service communications are to be started, the bandwidth identifiers assigned to the emergency transfer service communications, and the transfer rate to be used for the emergency transfer service communications. When emergency transfer is requested, the camera nodes 30 which are indicated for data transfer stoppage receive the request and stop the data transfer taking place in the communication associated with the bandwidth identifier to be stopped. Also, when emergency transfer is requested, the camera nodes indicated in the request for emergency transfer services start transferring image data to the monitor nodes 18 at the transfer rates specified in the emergency transfer request. The message format used for sending the detailed image data is similar to the format used in the first embodiment (see FIG. 24F) with the addition of a bandwidth identifier assigned to the emergency transfer service communication at the local node.

The following is a description of communication restrictions. In the second embodiment, the communication restrictions described earlier are performed by the bandwidth controller node 80 using the network control rules table 1172. FIG. 39 shows an example of the network control rules table 1172. The network control rules table 1172 corresponds to the bandwidth information table shown in FIG. 38 and contains rules, which are generated based on the bandwidth information table, that are needed for controlling communication bandwidths according to the contents indicated in the bandwidth information table. More specifically, the network control rules table 1172 shown in FIG. 39 sets forth the following control rules.

- B_ALL (the entire network bandwidth) is 6.0 Mbytes (1670).
- In the reserved bandwidth transfer service (RS), the reserved bandwidth communication with identification number 0(RS[0]_R) is 3.0 Mbytes (1674).
- In the reserved bandwidth transfer service (RS), the reserved bandwidth communication with identification number 0(RS[1]_R) is 2.0 Mbytes (1678).
- If the active bandwidth of an emergency transfer service (ES) communication (ES_S) is 0 Mbytes or greater, then the active bandwidth of the reserved bandwidth, transfer service (RS) communication with identification number 0(RS[0]_S) is set to 0.0 Mbytes and the active bandwidth of the reserved bandwidth transfer service (RS) communication with identification number 1(RS[1]_S) is set to 0.0 Mbytes (1682).
- If the active bandwidth (SS_S) of the statistical multiplex transfer service (SS) is greater than B_ALL (the entire, network bandwidth) minus the sum of the bandwidths assigned to the "reserved bandwidth transfer service" communications, the active bandwidths of the two "reserved bandwidth transfer service" communications are set to both be half the bandwidth remaining in B-ALL (the entire network bandwidth) that is not being used by the active bandwidth (SS_S) for the "statistical multiplex transfer service (SS)" (1690).
- If neither of the two IF conditions 1682, 1686 are valid, then, based on the rules 1674, 1678, the active bandwidth of the reserved bandwidth transfer service (RS) communication with identification number 0(RS[0]_R) is set to 3.0 Mbytes, and the active bandwidth of the reserved bandwidth transfer service (RS) communication with identification number 1(RS[1]_R) is set to 2.0 Mbytes (1691, 1692).

Figure 40:
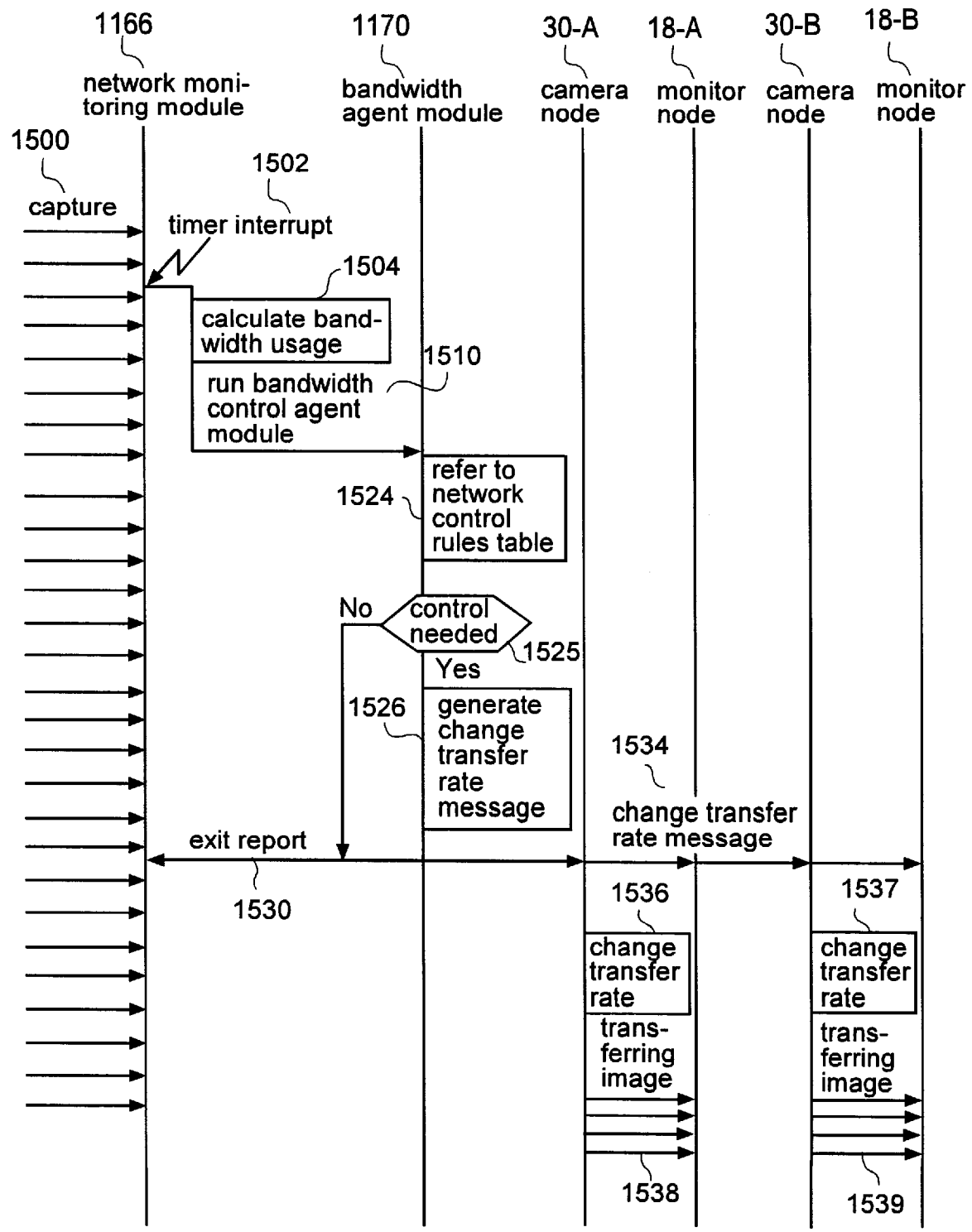
FIG. 40 is a diagram which shows the sequence of operations used to implement communication restrictions according to the second embodiment.

FIG. 40 shows the sequence of operations involved in restricted communications implemented using these control rules. The network monitoring module 116 of the bandwidth controller node 80 captures all messages flowing over the network 10 (1500). The network monitoring module 1166 is set up so that a timer interrupt is generated at a predetermined interval. When a timer interrupt is generated (1502), the bandwidth usage is calculated by transfer service type (1504). In other words, calculations are performed for the three transfer services: "reserved bandwidth transfer service," "statistical multiplex service," and "emergency transfer service."

When the bandwidth usage is calculated, the network monitoring module 1166 starts up the bandwidth control agent module 1170 (1510). The bandwidth control agent module 1170 looks up the network control rules table 1172 (1524) and applies the control rules therein to the bandwidth usage figures calculated for the different transfer services. A determination is then made as to whether the transfer rate of a node must be changed and whether control operations need to be performed (1525). If control operations are necessary, the bandwidth information table is used as a reference to generate a transfer rate control message, which includes a list of nodes for which the transfer rates are to be changed according to the control rules, the bandwidth identifiers of the communications for which the transfer rates are to be changed, and a list of updated transfer rates (1526). This information is broadcast as a reserved bandwidth transfer request (1534). Also, the network monitoring module is notified that the operation has been completed (1530).

The camera nodes 30 specified in the transfer rate control message for transfer rate changes the message, and the transfer rate of the bandwidth identifier indicated in the message is changed to the specified rate. Image transfer to the monitor node 18 is then started (1536, 1537). The camera node 30 for which image transfer has started continues sending the image data at the same transfer rate until the next request is received (1538, 1539).

Figure 41:
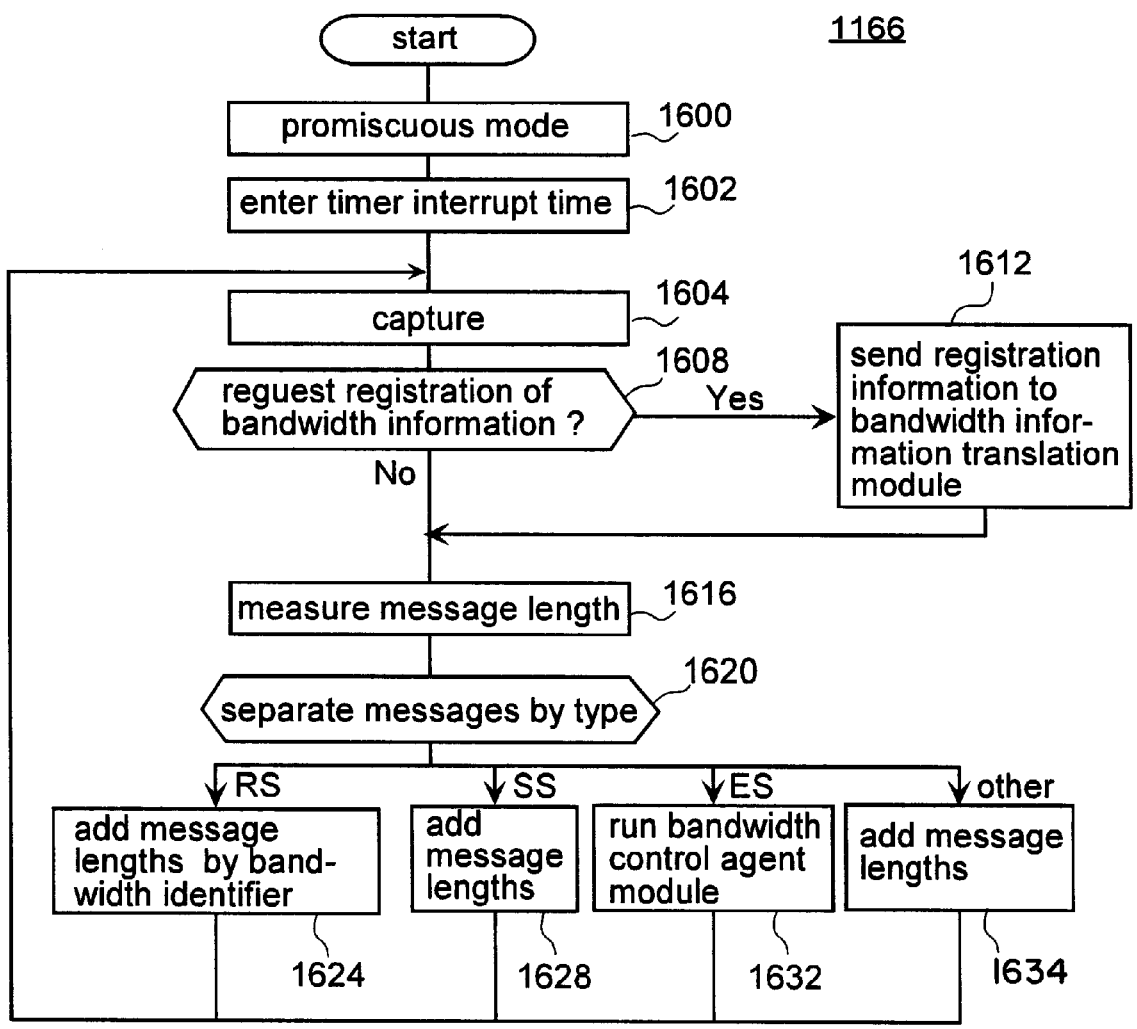
FIG. 41 is a flow diagram of the operations performed by the network monitoring module according to the second embodiment.

The following is a description of the operations performed by the bandwidth controller node 80 when communication restrictions take place. FIG. 41 shows the steps that are performed by the network monitoring module 1166. The network monitoring module 116 sets the network controller 806 to a promiscuous mode (step 1600) so that it can capture all the messages flowing through the network. Then, a timer interrupt time is entered (1602). This timer interrupt time determines the frequency at which the network status is checked. For example, if "100 ms" is entered, network status will be checked 10 times a second. Once message capturing is started (step 1604), the capturing continues until the network monitoring module 1166 is stopped. Thereafter, each time a message is captured, the captured message is checked to see if it is a bandwidth information registration request sent from the bandwidth control manager module 160 (step 1608). If it is, the bandwidth information table 154 in this message is transferred to the bandwidth information translation module 1168 (step 1612).

The message lengths of the captured messages are measured (step 1616). Then the messages are categorized by message type using the bandwidth identifier added to the messages and the bandwidth information table. Here, the messages are separated into "reserved bandwidth transfer service (RS)," "statistical multiplex transfer service (SS)", "emergency transfer service (ES)", and other services (step 1620). If the message is a "reserved bandwidth transfer service (RS)" message, it is further categorized by a bandwidth identifier and the incoming message lengths are added (step 1624). If the message is a "statistical multiplex transfer service (SS)" message or another service, the incoming message lengths are added (step 1628, step 1634). If the message is an "emergency transfer service (ES)", the bandwidth usage for the emergency transfer service is set to a non-zero value and the bandwidth control agent module is started immediately (step 1632).

Figure 42:
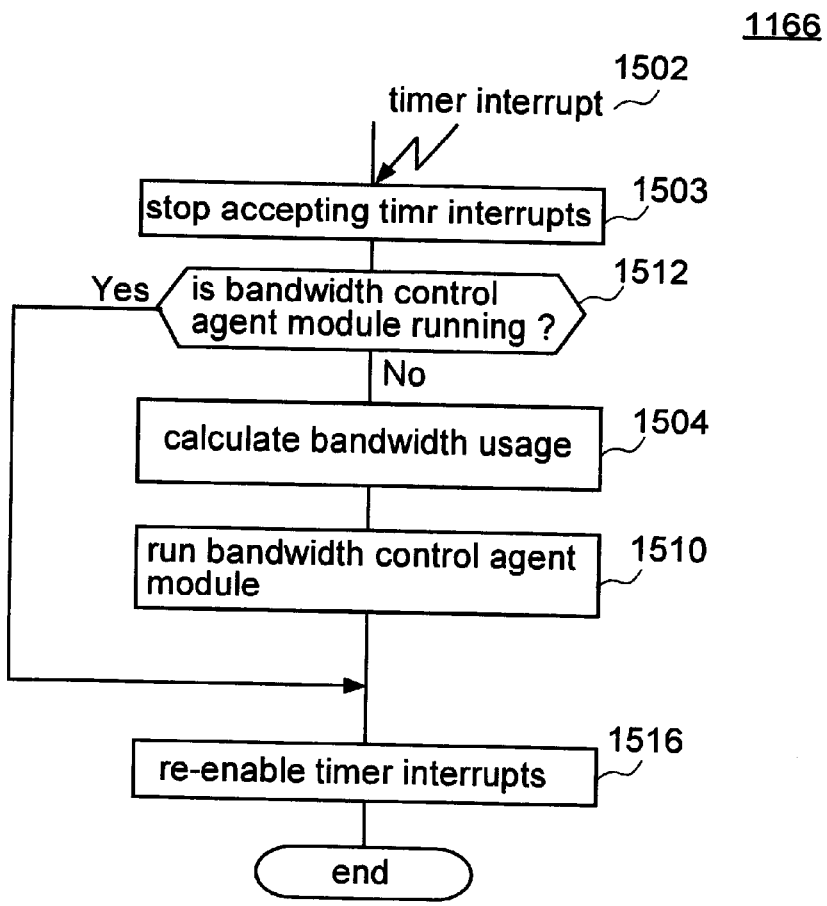
FIG. 42 is a flow diagram of the operations performed by the network monitoring module according to the second embodiment.

If the timer set up at step 1602 times out and generates a timer interrupt, the network monitoring module 1166 performs the operations shown in FIG. 42. When a timer interrupt is generated (step 1502), timer interrupt handling is halted in order to prevent two or more instances of this operation being run at the same time (step 1503). Next, a determination is made as to whether the bandwidth control agent module 1170 is already running (step 1512). If it is not, bandwidth usage for the different transfer service types is calculated by taking the message lengths of the different transfer service types that had been added at step 1624, step 1628, and step 1634 and dividing by the timer interrupt time (step 1504). The message lengths for the transfer service types added at step 1624, step 1628, and step 1634, are initialized to 0 each time the timer times out. Then, the bandwidth control agent module 1170 is started up (step 1510) and timer interrupt handling is restored (step 1516), thus completing this operation.

As described previously, the bandwidth control agent module 1170 started up at step 1632 in FIG. 41 or at step 1510 in FIG. 42 uses the control rules indicated in the network control rules table 1172 and applies them to the bandwidth usage by transfer service type, as calculated by the network monitoring module 1166. If the transfer rate of a node must be changed and control operations must be performed to achieve this, then a transfer rate control message is generated. The transfer rate control message includes a list of nodes for which the transfer rate is to be changed, the bandwidth identifiers of the communications for which the transfer rate is to be changed, add a list of new transfer rates. This transfer rate control message is broadcast as a request for reserved bandwidth transfer The network monitoring module is informed that the operation has been completed.

Figure 43:
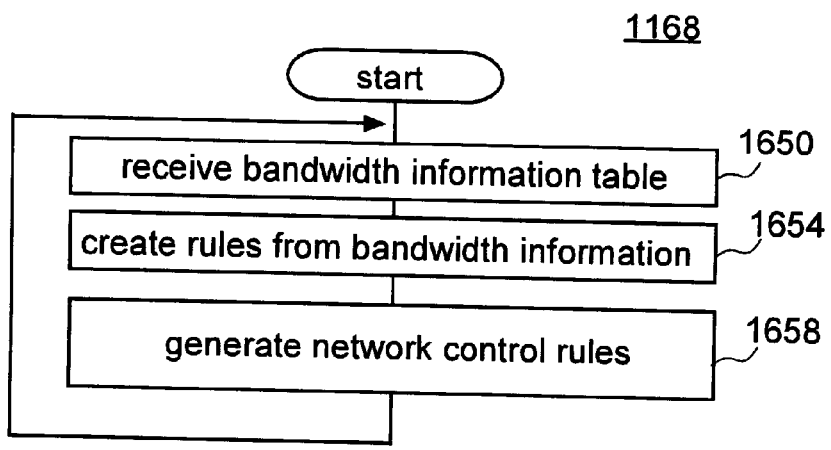
FIG. 43 is a flow diagram of the operations performed by the bandwidth information translation module according to the second embodiment.

FIG. 43 shows the operations performed by the bandwidth translation module 1168, which is run at step 1612 from FIG. 41. The bandwidth translation module 1168 receives the bandwidth information table 154 from the network traffic monitoring module 1166 (step 1650), and generates control 16 rules needed for controlling communication bandwidths according to the contents of the bandwidth information table (step 1654). The control rules are written to the network control rules table 1172 (step 1658). This concludes the description of how the bandwidth controller node 80 operates.

As in the first embodiment, with the operations of the bandwidth controller node 80 described above, the activation of emergency transfer service communications causes all other communications that use the other services to stop. Also, when the statistical multiplex transfer service communications exceed the bandwidth B3 allocated for the statistical multiplex transfer service shown in FIG. 12, the bandwidth B2 for the reserved bandwidth transfer service is reduced, thus allowing statistical multiplex transfer service communications to be performed without delays.

This concludes the description of the second embodiment of the present invention. In the second embodiment, the bandwidth controller node 80 is provided as an independent node, but it would also be possible to have the functions of the bandwidth controller node 80 be implemented in another node such as within the operation unit 20.

In the embodiment described above, a bandwidth identifier is added to messages, and this identifier is used to determine which communications registered in the bandwidth information table correspond to messages captured by the bandwidth controller node 80. However, if only a single communication using a single transfer service is assigned to a single node, it would also be possible to omit adding a bandwidth identifier to messages and to instead use the source node of the message to reference the bandwidth information table in order to determine which communication registered in the bandwidth information table corresponds to a captured message. Also, if only a single communication using a single transfer service is assigned to a single node, it would be possible to add a transfer service, to messages rather than a bandwidth identifier. The message transfer type would be used to determine the transfer service type corresponding to a captured message, and then the source node and the transfer service type of a message could be used to reference the bandwidth information table to determine which communication registered in the bandwidth information table corresponds to the captured message.

As described above, the second embodiment provides the advantages of the first embodiment while also allowing the usage conditions of the network to be measured directly according to transfer service type. Thus, network traffic can be assessed accurately and in a more detailed manner according to transfer service type, Communications can be controlled based on this so that the bandwidth used for communication by all of the nodes can be controlled in an efficient and detailed manner.

In the second embodiment, bandwidth is controlled based on transfer service types, such as the reserved bandwidth transfer service, the statistical multiplex transfer service, and the emergency transfer service. Thus, the structure of the second embodiment allows bandwidths to be controlled based on certain attributes, and it would also be possible to control bandwidths in a similar manner based on application, source address, destination address, protocol, transport number, or another communication attribute.

As described above, the present invention allows efficient use of bandwidth in a surveillance system that mixes communication where information is generated uniformly over time and communication where information is generated non-uniformly over time, without resulting in delays to communication of important information that must be transferred, rapidly. Also, with the present invention, delays and data loss in important information communicated in the surveillance system can be prevented.

What is claimed is:

1. A surveillance system that monitors transfer of data comprising:

an input node capturing a state of an item to be monitored;

an outputting information representing said state of said item to be monitored;

a control node controlling said input node and said output node; and a network transferring data between said input node, said output node, and said control node;

wherein said control node determines a transfer capacity for a first type of data to be transferred uniformly over time, a total of said transfer capacity being no greater than a prescribed amount smaller than a total transfer capacity of said network;

if said input node, said output node, of said control node performs transfer of said first type of data, said data is transferred at a transfer rate corresponding to said determined transfer capacity; and if said input node, said output node, or said control node performs transfer of a second type of data for non-uniform transfer over time, said data is transferred at a transfer rate corresponding to an available capacity of said network.

2. A surveillance system as described in claim 1 wherein, when there is an instruction to grant priority to prescribed transfer, said control node issues an instruction to stop data transfers to said input node or said output node performing data transfers other than said prescribed transfer, and a transfer rate for said prescribed transfer is increased.

3. A surveillance system according to claim 2, wherein:

said prescribed transfer is transfer of said first type of data;

said control node reassigns transfer capacities so that a transfer capacity assigned to said prescribed transfer is increased; and said input node or said output node performing said prescribed transfer transfers data at a transfer rate corresponding to said re-assigned transfer capacity.

4. A surveillance system monitoring and controlling data transferred over a network between an input node, which captures a state of an object, being monitored, and an output node, which outputs information representing said state of said object being monitored, said surveillance system comprising means for controlling said input node or said output node performing transfer of a first type of data so that if traffic in said network is at least at a prescribed level, a transfer rate used to transfer said first type of data via said network is reduced;

wherein said input node or said output node transferring said first type of data reduces said transfer rate in response to said control from said controlling means, thus maintaining or increasing a transfer rate of transfers of a second type of data different from said first type.

5. A surveillance system as described in claim 4 wherein:

said controlling means controls said input node or said output node transferring said first type of data so that a transfer rate for said first type of data is reduced, after, which, if traffic in said network is reduced to no more than a prescribed level, said controlling means controls said input node or said output node transferring said first type of data so that said transfer rate for said first type of data is increased; and said input node or said output node transferring said first type of data increases said transfer rate in response to control from said controlling means.

6. A network system comprising a communication node performing communications belonging to one of a plurality of communication types and a control node connected to said network, said control node including:

means for storing a conditions table containing conditions to be fulfilled by bandwidth used by communications in a network for each of said plurality of communication types;

means for detecting bandwidth used in a network by each communication for each of said plurality of communication types; and means for controlling said communication node via said network to change bandwidth use to fulfill said conditions contained in said condition table if detected bandwidth use by said communication types do not fulfill said conditions.

7. A network system as described in claim 6 wherein conditions contained in said conditions table for one of said plurality of communication types include a condition that is fulfilled in relation to network bandwidth usage for another of said plurality of communication types.

8. A network system as described in claim 6 wherein said detecting means measures, for each of said communication types, communication data transferred over said network in order to detect bandwidth used in said network by each of said plurality of communication types.

9. A network system comprising: a communication node performing communications via a network, said communications belonging to either a first communication type or a second communication type; and a control node connected to said network; said control node including:

means for storing a bandwidth information table containing bandwidth assigned to communications of said first communication type;

means for detecting bandwidth used in said network by said second communication type by measuring communication data flowing through said network; and means for controlling, via said network, a communication node performing communications of said first communication type in order to reduce bandwidth being used by said first communication type if a detected bandwidth usage by said second communication type exceeds a difference between a network bandwidth that can be used for communication for said first communication type and said second communication type and a bandwidth assigned to said first communication type as described is said bandwidth information table.

10. A network system comprising: a communication node performing communications via a network that belong to either a first communication type or a second communication type, and a control node connected to said network, said control node including:

means for detecting generation of communications of said second communication type by measuring communication data flowing over said network; and means for controlling, via said network, said communication node performing communications of said first communication type to stop a communication of said first communication type if said generation of a communication of said second communication type is detected.

* * * * *